(12) United States Patent
Hirota

(10) Patent No.: US 9,204,408 B2
(45) Date of Patent: Dec. 1, 2015

(54) RELAYING APPARATUS AND RELAYING METHOD

(75) Inventor: Masaki Hirota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 535 days.

(21) Appl. No.: 13/565,245

(22) Filed: Aug. 2, 2012

(65) Prior Publication Data
US 2013/0077509 A1 Mar. 28, 2013

(30) Foreign Application Priority Data
Sep. 26, 2011 (JP) .................. 2011-209935

(51) Int. Cl.
*H04W 56/00* (2009.01)
*H04L 12/26* (2006.01)
*H04J 1/00* (2006.01)
*H04J 3/06* (2006.01)
*H04L 12/875* (2013.01)
*H04L 12/863* (2013.01)
*H04B 7/155* (2006.01)

(52) U.S. Cl.
CPC ........... *H04W 56/0025* (2013.01); *H04B 7/155* (2013.01); *H04J 3/0673* (2013.01); *H04L 43/106* (2013.01); *H04L 47/56* (2013.01); *H04L 47/6215* (2013.01); *H04J 3/0667* (2013.01); *H04L 43/0852* (2013.01)

(58) Field of Classification Search
CPC ..................................................... H04J 3/0667
See application file for complete search history.

(56) References Cited

U.S. PATENT DOCUMENTS

| | | | | |
|---|---|---|---|---|
| 7,715,374 | B2 * | 5/2010 | Masuya ................. | H04J 3/0632 370/352 |
| 2005/0232227 | A1 * | 10/2005 | Jorgenson ............... | H04L 41/14 370/351 |
| 2008/0232521 | A1 * | 9/2008 | Rodbro ................. | H04J 3/0632 375/354 |
| 2009/0028095 | A1 * | 1/2009 | Kish ................. | H04W 72/1242 370/328 |
| 2011/0158263 | A1 | 6/2011 | Karino | |
| 2012/0300859 | A1 * | 11/2012 | Chapman .............. | H04J 3/0667 375/257 |
| 2014/0146811 | A1 * | 5/2014 | Wen ...................... | H04J 3/0667 370/350 |

FOREIGN PATENT DOCUMENTS

| | | |
|---|---|---|
| JP | 2003-60546 | 2/2003 |
| JP | 2008-22131 | 1/2008 |
| JP | 2010-56947 | 3/2010 |

OTHER PUBLICATIONS

Chen et al, "Kalman filter-Based Approximation of a Network Calculus TCP Controller", 2006 40th Annual Conference on Information Sciences an Systems, pp. 591-596, Mar. 22-24, 2006.*
Alcatel-Lucent, Simultaneous eNB and UE Reciprocity Calibration, 3GPP TSG RAN WG1 Meeting #60 published Feb. 22-26, 2010.*
Alcatel-Lucent, "Antenna Array Calibration for TDD CoMP", 3GPP TSG RAN WG presented Nov. 9-13, 2009.*
Japanese Office Action issued Dec. 16, 2014 in corresponding Japanese Patent Application No. 2011-209935.

* cited by examiner

*Primary Examiner* — Andrew Lai
*Assistant Examiner* — Hoyet H. Andrews, III
(74) *Attorney, Agent, or Firm* — Staas & Halsey LLP

(57) ABSTRACT

A relaying apparatus includes a memory that stores a program including a procedure, and a processor that executes the program including the procedure, wherein the procedure includes delaying, when received packet data includes a synchronization message for any one of a frequency synchronization and a time synchronization, a transmission of the received packet data so that a period of time for a relaying process attains a given value.

20 Claims, 17 Drawing Sheets

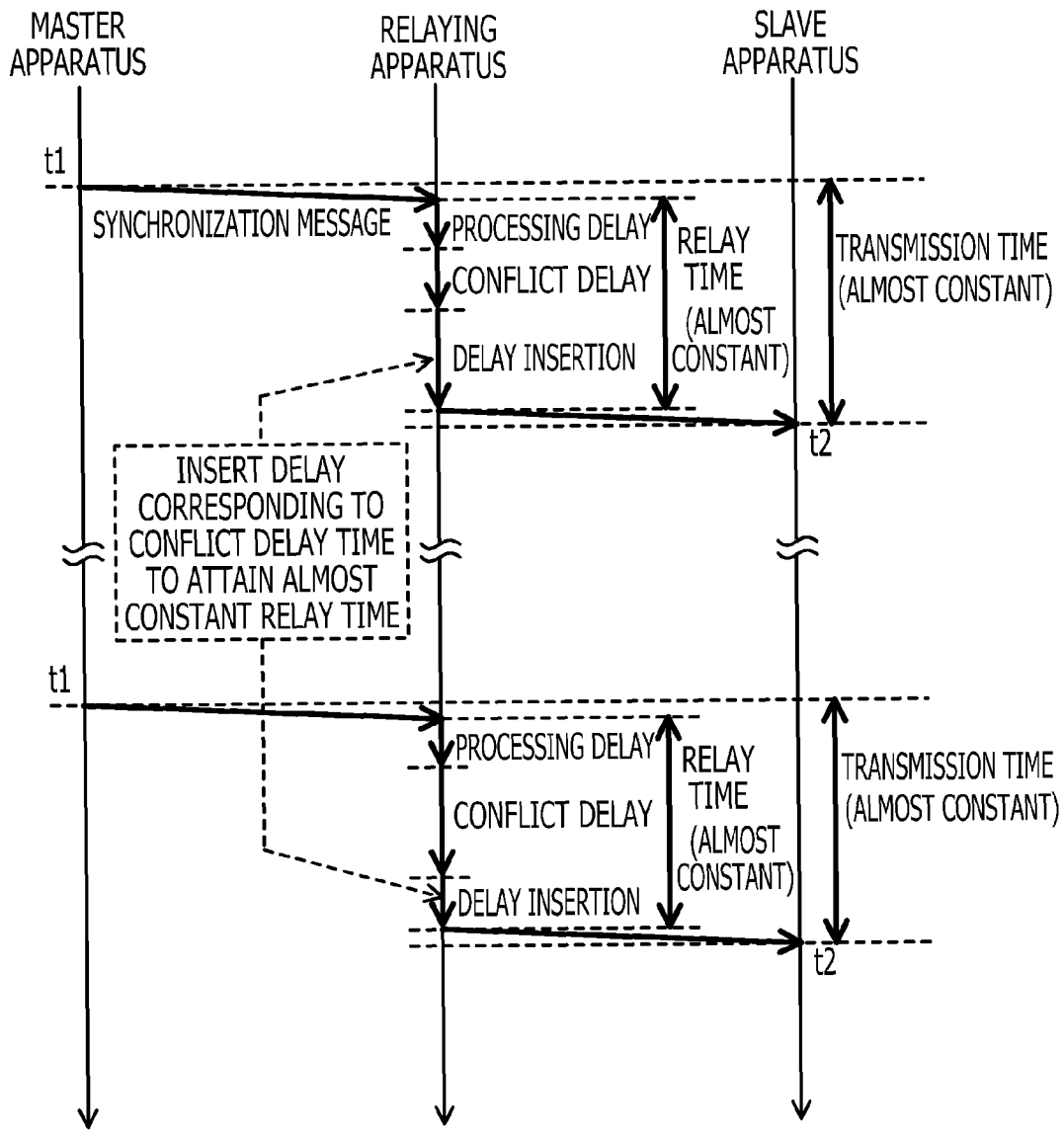

RELAYING APPARATUS AND RELAYING METHOD

CROSS-REFERENCE TO RELATED APPLICATION

This application is based upon and claims the benefit of priority of the prior Japanese Patent Application No. 2011-209935, filed on Sep. 26, 2011, the entire contents of which are incorporated herein by reference.

FIELD

The embodiments discussed herein are related to a relaying apparatus and a relaying method.

BACKGROUND

In recent years, in a transmission network including a relaying apparatus employing a packet technique, such as a router or a switch, demands for time synchronization and frequency synchronization among information processing apparatuses installed in various locations in the transmission network have been increased.

As a method for performing the time synchronization and the frequency synchronization in the packet transmission network, the IEEE1588 has been generally used. The IEEE 1588 has a potential capable of microsecond-order high-accuracy time synchronization, and particularly, use of the IEEE 1588 in the time synchronization and the frequency synchronization among mobile base stations is expected.

FIG. 1 is a diagram illustrating a time synchronization method in accordance with the IEEE 1588. As illustrated in FIG. 1, in the time synchronization method conforming to the IEEE 1588, dedicated messages which are referred to as "PTP (Precision Time Protocol) messages" are exchanged between a slave apparatus and a master apparatus through a relaying apparatus such as a router or a switch. The slave apparatus measures transmission times t-ms and t-sm between the master apparatus and the slave apparatus by bi-directionally exchanging a transmission time stamp and a reception time stamp with the master apparatus using the synchronization messages. The slave apparatus calculates a time offset amount Offset relative to the master apparatus in accordance with the measured transmission times t-ms and t-sm and performs a time synchronization process.

FIG. 2 is a diagram illustrating a packet transmission network 200 including a master apparatus and slave apparatuses which conform to the IEEE 1588. The packet transmission network 200 includes a master apparatus 202, a slave apparatus 204 (204-1 and 204-2), a relaying apparatus 206 (206-1 to 206-5), and an information processing apparatus 208 (208-1 to 208-3). The information processing apparatuses 208-1 and 208-2 installed on the slave apparatus 204 side are wireless base stations for wireless terminals, for example, and the information processing apparatus 208-3 installed on the master apparatus 202 side is a wireless station apparatus, for example.

In the packet transmission network 200, the relaying apparatus 206 installed in a transmission path between the master apparatus 202 and the slave apparatus 204 relays a synchronization message to be exchanged between the master apparatus 202 and the slave apparatus 204. In FIG. 2, as denoted by a dashed line, an exchange of a synchronization message between the master apparatus 202 and the slave apparatus 204-1 through the relaying apparatuses 206-1 to 206-3 are illustrated as an example. The slave apparatus 204-1 exchanges a transmission time stamp and a reception time stamp with the master apparatus 202 using the synchronization message to thereby estimate a time offset amount relative to the master apparatus and perform a time synchronization process. The slave apparatus 204-1 outputs time information obtained through the time synchronization process to the information processing apparatus 208-1 which corrects an internal setting regarding a time in accordance with the time information.

Here, when the relaying apparatuses 206-1 to 206-3 relay the synchronization message, traffic of user data (packet data) may be input to an input port other than an input port for the synchronization message (packet data) and output from an output port for the synchronization message in the relaying apparatuses 206-1 to 206-3. That is, the user traffic may join the synchronization message. In FIG. 2, as denoted by a dashed-dotted line, generation of traffic of user data between the information processing apparatuses 208-1 and 208-3 is illustrated as an example, and the user traffic joins the synchronization message in the individual relaying apparatuses 206-1 to 206-3.

FIG. 3 is an internal configuration of the relaying apparatus 206. The relaying apparatus 206 includes a selector 302, a writing controller 304, a reading controller 306, a plurality of queues 308 (308-1 to 308-$k$), and a selector 310. The queues 308 (308-1 to 308-$k$) and the selector 310 are realized by a memory 312.

Packet data input to a plurality of input ports #1 to #N of the relaying apparatus 206 is selected by the selector 302. The selected packet data is stored in one of the queues 308-1 to 308-$k$ by the writing controller 304 in accordance with a priority level of the packet data. Assuming that the priority level of the synchronization message described above is higher than that of the user data, the synchronization message is stored in the queue 308-1 and the user data is stored in the queue 308-$k$. The selector 310 selects one of the queues which store the packet data as an output destination in accordance with priority control performed by the reading controller 306 and outputs packet data stored in the selected queue to the outside through an output port of the relaying apparatus 206.

Accordingly, even in a case where user data which has arrived in the relaying apparatus 206 before the synchronization message arrives in the same relaying apparatus 206 has being read from a corresponding one of the queues 308 and the synchronization message is stored in the priority-class queue 308-1, the synchronization message is not allowed to be read from the queue 308-1 after being stored in the queue 308-1 and is allowed to be read after the reading of the user data is completed.

For example, as described above, when conflict between the synchronization message and the user data which has arrived before the synchronization message occurs, the synchronization message waits an output thereof in a corresponding one of the queues 308, and therefore, relay of the synchronization message delays by a waiting time caused by the conflict. Since the delay of the relay of the synchronization message depends on a packet length of the user data and a conflict state such as a timing when the user data joins the synchronization message in the same relaying apparatus, an amount of the delay of the relay varies in accordance with a conflict situation. Such variation of a relay delay amount is referred to as PDV (Packet Delay Variation).

FIG. 4 is a diagram illustrating the PDV of the synchronization message. As illustrated in FIG. 4, a transmission time representing a period of time in which the synchronization message is transmitted from the master apparatus through the relaying apparatus to the slave apparatus includes a propagation time representing a period of time in which the synchronization message is transmitted in a transmission path between the master apparatus and the slave apparatus, a processing delay time representing a period of time which is used for a series of processes performed to relay the synchronization message through various units of the relaying apparatus, and a conflict delay time representing a period of time caused by the conflict with the other packet data.

In the transmission time, the propagation time and the processing delay time are determined in accordance with properties of the transmission path and the relaying apparatus and are fixed values irrespective of the synchronization message to be transmitted. However, the conflict delay time considerably varies in accordance with the conflict state of the synchronization message as described above. Accordingly, when the conflict delay is small, a value of a relay time in the relaying apparatus becomes small and a value of an entire transmission time also becomes small. On the other hand, when the conflict delay is large, the value of the relay time in the relaying apparatus becomes large and the value of the entire transmission time also becomes large. Consequently, the relay time of the synchronization message in the relaying apparatus varies in accordance with a degree of the conflict delay.

Note that, although a case where a synchronization message is transmitted from the master apparatus to the slave apparatus is illustrated in FIG. 4, the relay time of the relaying apparatus varies also in a case where a synchronization message is transmitted from the slave apparatus to the master apparatus.

Note that the time offset amount is calculated in accordance with Expression (1).

$$\text{Offset} = ((t2-t1)-(t4-t3))/2 = ((t\text{-}ms)-(t\text{-}sm))/2 \quad (1)$$

When the slave apparatus calculates the time offset amount Offset in accordance with Expression (1), measurement errors occur in the transmission times t-ms and t-sm due to the variation of the relay time of the synchronization message in the relaying apparatus. The measurement error leads to an error of the time offset amount to be calculated. Accordingly, it is desirable to suppress variation of the relay time in the relaying apparatus.

FIG. 5 is a diagram illustrating a technique which enables absorption of the variation of the relay time in the relaying apparatus. As illustrated in FIG. 5, in the relaying apparatus, a reference value (almost constant) of the relay time is set in advance, and a delay is inserted into a relay of the synchronization message such that the entire relay time in the relaying apparatus becomes equal to the reference value.

For example, the reference value (almost constant) of the relay time is set as a large value including a certain margin such that a sum of a processing delay time and a conflict delay time does not exceed the reference value, taking the variation of a conflict delay depending on the conflict state of the synchronization message into consideration. In this state, the relaying apparatus calculates the conflict delay time for each synchronization message inside the relaying apparatus and calculates a difference value between the reference value (almost constant) of the relay time and the sum of the processing delay time (fixed value) and the conflict delay time. The relaying apparatus inserts a delay corresponding to the calculated difference value when relaying the synchronization message inside the relaying apparatus. Accordingly, the relaying apparatus inserts a large delay when the conflict delay is small whereas the relaying apparatus inserts a small delay when the conflict delay is large.

Accordingly, in the example illustrated in FIG. 5, the relaying apparatus inserts a delay in accordance with the conflict delay time so that the entire relay time of the synchronization message becomes equal to the reference value determined in advance to thereby absorb the variation of the relay time.

Note that the technique regarding the absorption of variation of a relay time in a relaying apparatus is disclosed in the Japanese Laid-open Patent Publication No. 2008-022131, for example.

SUMMARY

According to an aspect of the invention, a relaying apparatus includes a memory that stores a program including a procedure, and a processor that executes the program including the procedure, wherein the procedure includes delaying, when received packet data includes a synchronization message for any one of a frequency synchronization and a time synchronization, a transmission of the received packet data so that a period of time for a relaying process attains a given value.

The object and advantages of the invention will be realized and attained by represents of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating a technique which enables absorption of variation of a relay time in the relaying apparatus;

DESCRIPTION OF EMBODIMENTS

Before embodiments are described, technical problems regarding the absorption of variation of a relay time of relaying illustrated in FIG. 5 which are considered by an inventor will be described.

Figure 6A:
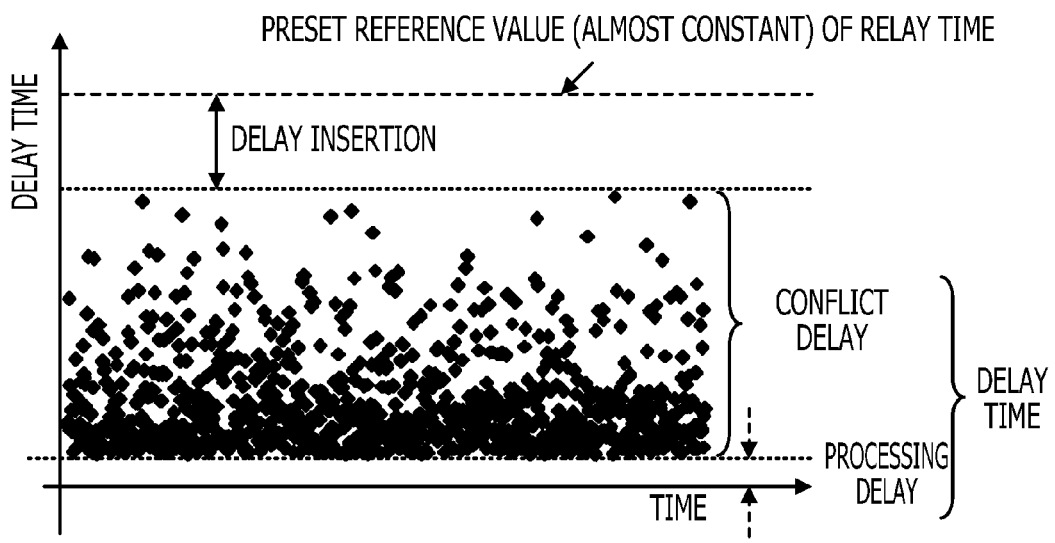
FIGS. 6A and 6B are diagrams illustrating problems of the technique regarding the absorption of variation of a relay time illustrated in FIG. 5.
Figure 6B:
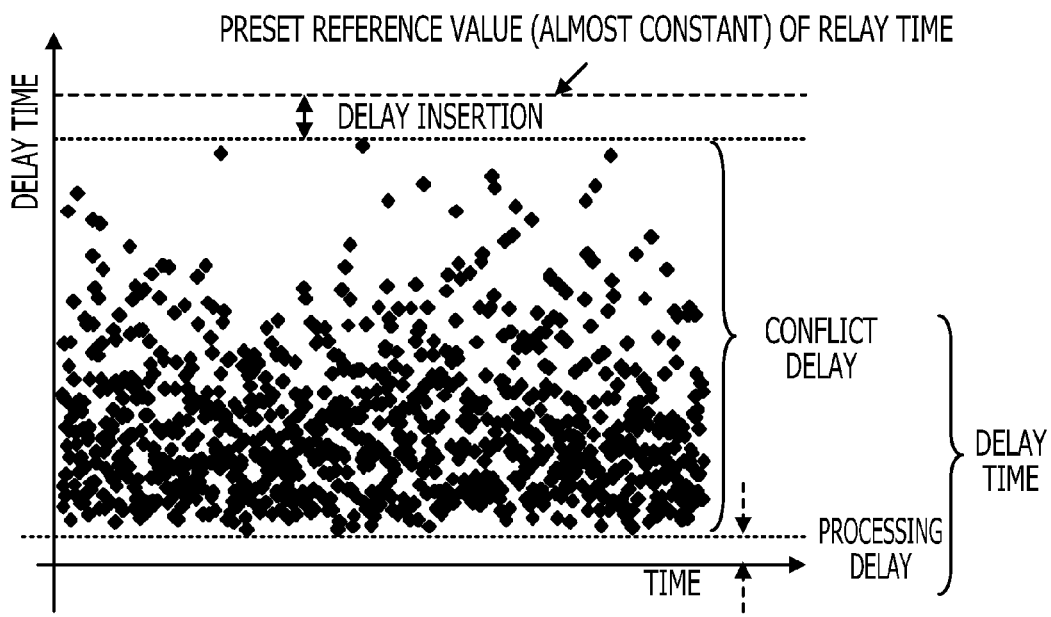

FIGS. 6A and 6B are diagrams illustrating problems of the technique regarding the absorption of variation of a relay time illustrated in FIG. 5.

As illustrated in FIG. 6A, when conflict traffic is small, conflict frequency of synchronization messages is low and the number of synchronization messages which do not conflict with other packets is increased. Accordingly, distribution of conflict delay times is narrow, and values of the conflict delay times are small as a whole.

On the other hand, as illustrated in FIG. 6B, when conflict traffic is large, conflict frequency of synchronization messages is high and the number of synchronization messages which do not conflict with other packets is reduced. Accordingly, distribution of conflict delay times is large, and values of the conflict delay times are large as a whole.

Here, as described above, since the conflict delay varies in accordance with a conflict state of the synchronization message, a reference value (almost constant) of the relay time is set as a large value including a certain margin such that a sum of a processing delay time and a conflict delay time does not exceed the reference value. In the examples illustrated in FIGS. 6A and 6B, the reference value (almost constant) of the relay time is set taking a case where a large conflict traffic band and a large conflict delay are obtained as illustrated in FIG. 6B into consideration.

Therefore, in a case where a small conflict traffic band and a small conflict delay are obtained as illustrated in FIG. 6A, the reference value of the relay time becomes too large and the relay time of the relaying apparatus becomes unnecessarily large. In particular, even in a case where conflict between the synchronization message and other packets does not occur in the relaying apparatus, a value of a difference between the reference value and the process delay time is inserted as a delay such that the relay time of the relaying apparatus becomes equal to the reference value (almost constant) of the relay time set in advance. When the conflict does not occur, even though the relay time of the relaying apparatus is as small as the processing delay time of the relaying apparatus, the relay time becomes considerably large since a delay is inserted in accordance with the reference value of the relay time.

When the relay time of the synchronization message of the relaying apparatus becomes large and the synchronization message is transmitted from the master apparatus to the slave apparatus, a period of time from when the master apparatus transmits the synchronization message to when the slave apparatus receives the synchronization message becomes large. For example, in FIG. 1, a transmission time t-ms of a transmission from the master apparatus to the slave apparatus becomes large. This is true for a case where the slave apparatus transmits a synchronization message to the master apparatus, that is, a transmission time t-sm of the transmission from the slave apparatus to the master apparatus becomes large.

Meanwhile, the slave apparatus generates a clock using an oscillator included therein, generates a time point to be referred to by itself in accordance with the generated clock, and performs a time synchronization process. However, the oscillator generally has a frequency deviation. The frequency deviation represents a shift of an oscillation frequency from a reference value due to a change of an operation condition or the like such as a change of temperature or a change of a power supply voltage. A time error of the slave apparatus caused by the frequency deviation affects time points t2, t3, and t5 obtained by the slave apparatus in FIG. 1.

Accordingly, when the relay time of the relaying apparatus becomes large at a time of a transmission of a synchronization message, the transmission time t-ms becomes large, and therefore, an amount of the time error caused by the frequency deviation stored in the time point t2 becomes large when using a transmission time t1 as a reference. Consequently, a time error stored in a measurement value of the transmission time t-ms becomes large. As a result, since a measurement error of the transmission time t-ms becomes large, an error of a calculated time offset amount becomes large resulting in an error of a time synchronization process performed by the slave apparatus.

If the relay time of the relaying apparatus at the time of a transmission of a synchronization message becomes large, a time difference between the calculation time point t5 when the time offset amount is calculated in the slave apparatus or the synchronization message reception time point t4 and a synchronization message transmission time point t3 becomes large. Therefore, time errors stored in the reception time point t4 and the calculation time point t5 are also increased when using the transmission time t3 as a reference. Accordingly, a difference between a value of a normal time offset amount at the time point t5 and a value of a time offset amount calculated in accordance with information on time points before the time point t5 (time points t3 and t4) becomes large, and the difference leads to an error of the time synchronization process performed by the slave apparatus.

Note that, although frequency deviation of an oscillator becomes small when an expensive oscillator is used, it is not preferable to use such an expensive oscillator since cost of the slave apparatus is increased.

As the relay time of the relaying apparatus for a transmission of a synchronization message becomes large, a period of time in which the synchronization message remains in the relaying apparatus becomes large and the number of synchronization messages remaining in the relaying apparatus becomes large. Therefore, in the relaying apparatus, a circuit size of a memory which stores the synchronization messages becomes large.

According to an embodiment of the present disclosure, it is desirable to absorb variation of the relay time without an unnecessarily long relay time of a relaying apparatus, reduce influence of frequency deviation of an oscillator without using an expensive oscillator in a time synchronization process executed by a slave apparatus so that improved processing accuracy is obtained.

Hereinafter, a relaying apparatus and a relaying method according to a first embodiment will be described.

Figure 7:
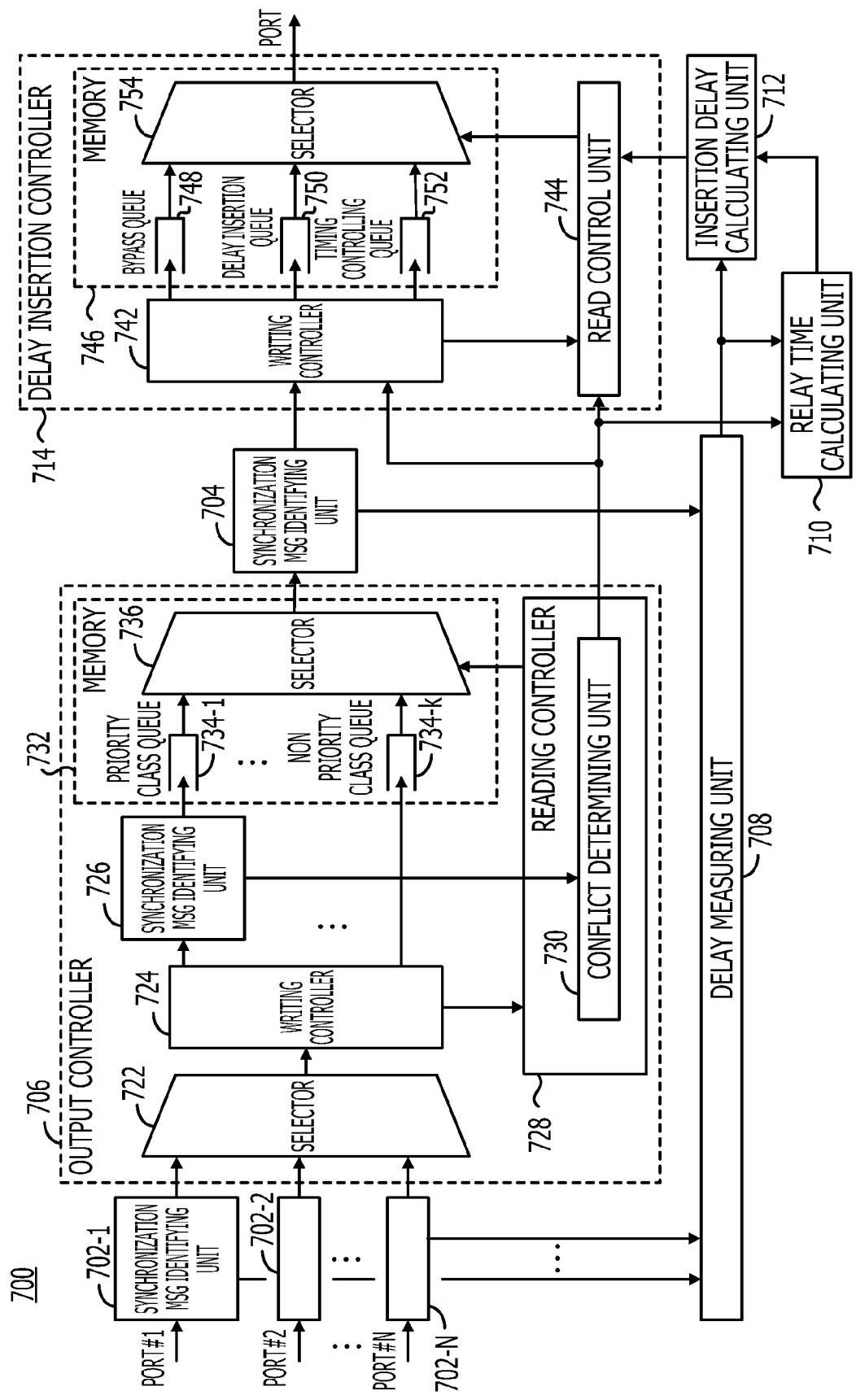
FIG. 7 is a diagram illustrating a configuration of a relaying apparatus 700 according to a first embodiment.

First, a configuration of a relaying apparatus 700 according to the first embodiment will be described. FIG. 7 is a diagram illustrating a configuration of the relaying apparatus 700 according to the first embodiment.

Note that, in the configuration of the relaying apparatus 700 of FIG. 7, a section corresponding to a single output port in the entire apparatus configuration is illustrated. Therefore, when the relaying apparatus 700 includes a plurality of output ports, the relaying apparatus 700 has a number of the configurations illustrated in FIG. 7 corresponding to the number of output ports. This is true for other embodiments below.

As illustrated in FIG. 7, the relaying apparatus 700 is a transmission apparatus which includes a synchronization message (hereinafter also referred to as "msg") identifying units 702 (702-1 to 702-N) and 704, an output controller 706, a delay measuring unit 708, a relay time calculating unit 710, an insertion delay calculating unit 712, and a delay insertion controller 714.

The output controller 706 includes a selector 722, a writing controller 724, a synchronization message identifying unit 726, a reading controller 728, a plurality of queues 734 (734-1 to 734-$k$), and a selector 736. The reading controller 728 includes a conflict determining unit 730. The queues 734 (734-1 to 734-$k$) and the selector 736 are realized by a memory 732.

The delay insertion controller 714 includes a writing controller 742, a reading controller 744, a bypass queue 748 for synchronization messages, a delay insertion queue 750 for synchronization messages, and a timing controlling queue 752 for packet other than synchronization messages. The bypass queue 748, the delay insertion queue 750, and the timing controlling queue 752 are realized by a memory 746.

Note that each of the units included in the relaying apparatus 700, such as the synchronization message identifying units 702-1 to 702-N and 704, the output controller 706, the delay measuring unit 708, the relay time calculating unit 710, the insertion delay calculating unit 712, and the delay insertion controller 714 are realized as a single hardware piece or a combination of a plurality of hardware pieces using dedicated or general hardware (electric or electronic circuit (ASIC, FPGA, or the like)). Alternatively, each of the units described above may be realized as a function obtained by loading a program stored in a storage (such as a ROM or a flash memory) into a RAM and executing the program using a processor (microprocessor) such as a CPU (Central Processing Unit) or a DSP (Digital Signal Processor).

The memories 732 and 746 may be realized independently from the other units of the relaying apparatus 700. That is, the memories 732 and 746 may be realized by RAMs (Random Access Memories).

In the other embodiments described below, units included in a relaying apparatus are similarly realized.

To a plurality of input ports #1 to #N, a plurality of packet data including synchronization messages such as PTP messages which conform to the IEEE 1588 are input. Although a case where a synchronization message corresponds to a PTP message conforming to the IEEE 1588 will be described as an example hereinafter, the synchronization message is not limited to a PTP message.

Here, a format of the PTP message which conforms to the IEEE 1588 will be described with reference to FIG. 8.

Figure 8:
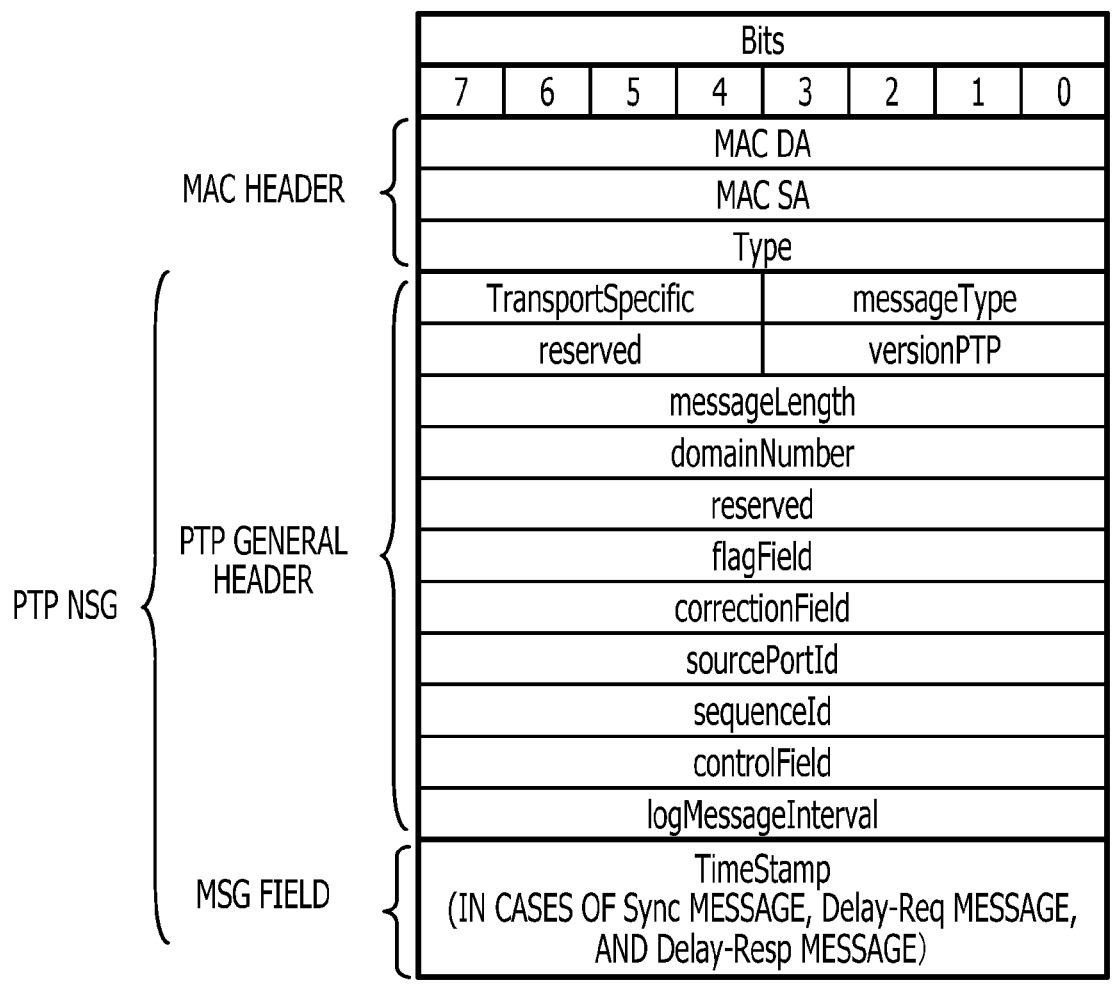
FIG. 8 is a diagram illustrating a format of a PTP message which conforms to the IEEE 1588.

As illustrated in FIG. 8, a MAC header is added to a PTP message. The MAC header includes MAC address information MAC DA representing a MAC address of a destination of the PTP message, MAC address information MAC SA representing a MAC address of a transmission source of the PTP message, and a type value Type representing a type of packet data.

The PTP message includes a PTP general header and a message field. The PTP general header includes a PTP message type value messageType representing a type of the PTP message and sequence identification information sequenceId representing a serial number of the PTP message. The PTP general header includes a plurality of reserved regions.

Types of a PTP message include a Sync message, a Delay-Req message, and a Delay-Resp message. In the time synchronization method conforming to the IEEE 1588 illustrated in FIG. 1, the Sync message is a synchronization message transmitted from the master apparatus to the slave apparatus and includes a transmission time stamp representing the transmission time t1 of the master apparatus. The Delay-Req message is a synchronization message transmitted from the slave apparatus which has received the Sync message to the master apparatus which has transmitted the Sync message and includes a transmission time stamp representing the transmission time t3 of the slave apparatus. The Delay-Resp message is a synchronization message transmitted from the master apparatus which has received the Delay-Req message to the slave apparatus which has transmitted the Delay-Req message and includes a transmission time stamp representing the transmission time t4 of the master apparatus.

Figure 1:
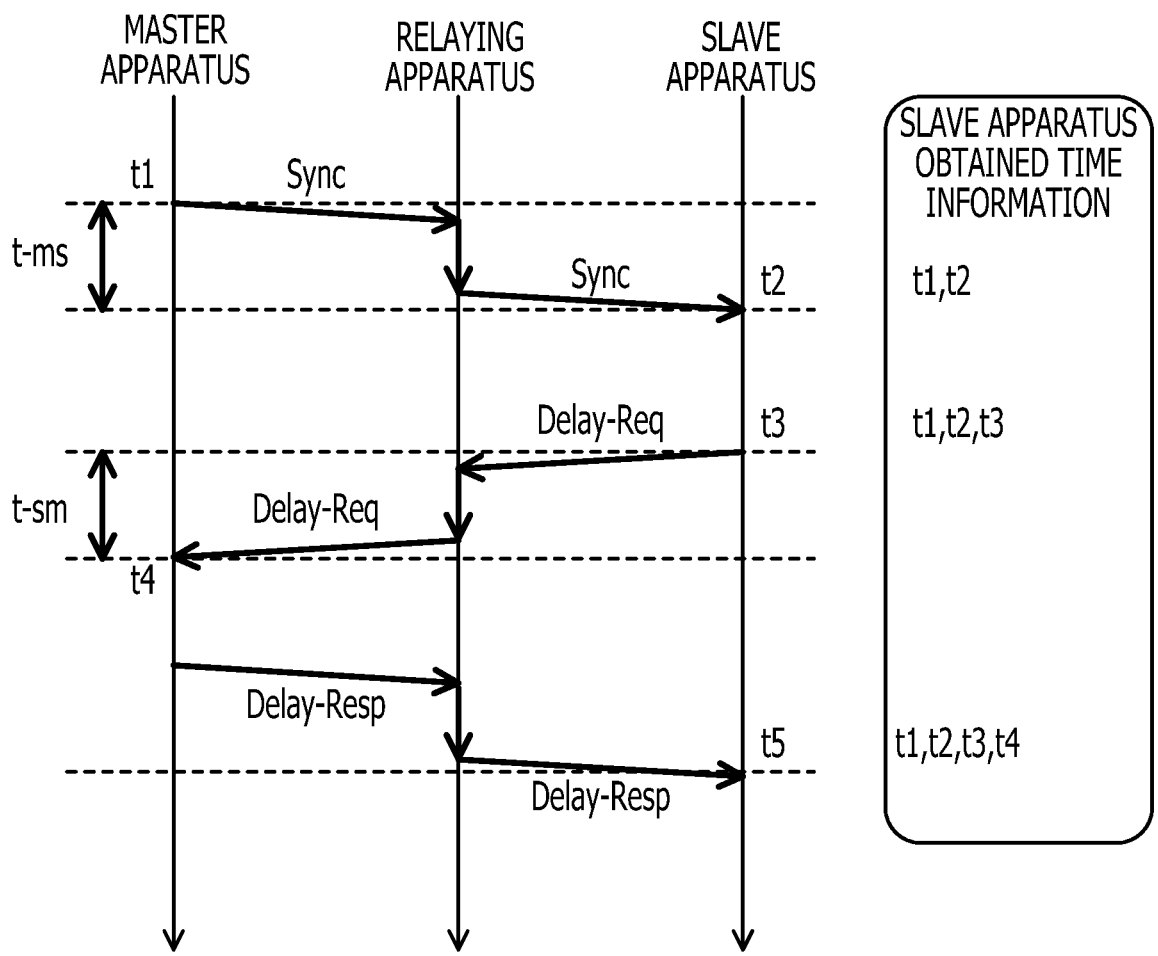
FIG. 1 is a diagram illustrating a time synchronization method in accordance with the IEEE 1588.

In the time synchronization method conforming to the IEEE 1588 illustrated in FIG. 1, the slave apparatus obtains the transmission time stamps t1 and t3 and the reception time stamps t2 and t4 using the master apparatus, the Sync message, the Delay-Req message, and the Delay-Resp message so as to obtain time information regarding transmissions and receptions of the synchronization messages and measure the transmission times t-ms and t-sm between the master apparatus and the slave apparatus. The slave apparatus estimates a time offset amount relative to the master apparatus in accordance with the measured transmission times using Expression (1), for example, and performs a time synchronization process.

The message field of the PTP message includes time stamp information TimeStamp which stores transmission time stamps or reception time stamps of the Sync message, the Delay-Req message, or the Delay-Resp message.

Referring back to FIG. 7, the plurality of synchronization message identifying units 702-1 to 702-N receive a plurality of packet data including synchronization messages from the corresponding input ports #1 to #N and determine whether the received packet data is a synchronization message. The determination as to whether certain data is a synchronization message is performed with reference to the PTP message type value messageType included in the PTP general header. For example, when the PTP message type value messageType represents one of the Sync message, the Delay-Req message, and the Delay-Resp message, the synchronization message identifying units 702-1 to 702-N determine that the received packet data is a synchronization message. The determination as to whether certain data is a synchronization message may be performed with reference to the sequence identification information sequenceId representing a serial number of a PTP message or the type value Type included in the MAC header.

In each of the synchronization message identifying units 702-1 to 702-N, when received packet data is a synchronization message, the synchronization message identifying unit extracts synchronization message identifying information included in the synchronization message and outputs the extracted synchronization message identifying information to the delay measuring unit 708. The extracted synchronization message identifying information includes a serial number of the PTP message represented by the sequence identification information sequenceId in the PTP general header, and includes a transmission source MAC address and a destination MAC address represented by the MAC address information MAC DA and the MAC address information MAC SA in the MAC header.

The output controller 706 has a function of a receiver which receives a plurality of packet data including synchronization messages transmitted through the plurality of input ports #1 to #N and the synchronization message identifying units 702-1 to 702-N. The output controller 706 receives the plurality of packet data including the synchronization messages from the synchronization message identifying units 702-1 to 702-N and controls timings of outputting of the received plurality of packet data to the delay insertion controller 714 through the synchronization message identifying unit 704.

The selector 722 receives the plurality of packet data including the synchronization messages from the synchronization message identifying units 702-1 to 702-N. The selector 722 selects one of the synchronization message identifying units 702-1 to 702-N and supplies the packet data of the selected one of the synchronization message identifying units 702-1 to 702-N to the writing controller 724.

The writing controller 724 stores the packet data in one of the queues 734-1 to 734-k included in the memory 732 in accordance with a priority level of the supplied packet data. It is assumed here that the synchronization message has a priority level higher than those of other packet data. Accordingly, the synchronization message is stored in the priority class queue 734-1 and other packet data is stored in the non-priority class queues 734-k, for example. The writing controller 724 outputs packet identifying information and packet length information of the packet data to be stored, and queue identifying information of a queue which is a destination of the storage of the packet data to the reading controller 728.

The synchronization message identifying unit 726 receives the synchronization message to be stored in the priority class queue 734-1 from the writing controller 724 and extracts the synchronization message identifying information included in the received synchronization message. The synchronization message identifying unit 726 outputs the extracted synchronization message identifying information to the conflict determining unit 730 of the reading controller 728.

The reading controller 728 receives the packet identifying information, the packet length information, and the queue identifying information from the writing controller 724 and performs a priority control process which is a process of reading packet data stored in the queues 734-1 to 734-k in order of priority level in accordance with the received information. The reading controller 728 determines a queue to be read from among the queues 734-1 to 734-k under the priority control and controls a timing when the packet data stored in the determined queue is read. The reading controller 728 outputs the queue identifying information of the queue which is a reading target, selection control information including the packet identifying information of the packet data to be read, and an instruction for reading the data stored in the queue to the selector 736 at the timing determined under the priority control.

The selector 736 receives the selection control information and the reading instruction from the reading controller 728, selects the queue of the reading target from among the queues 734-1 to 734-k in accordance with the received selection control information and the reading instruction, and outputs the packet data stored in the selected queue to the synchronization message identifying unit 704.

The conflict determining unit 730 receives the synchronization message identifying information from the synchronization message identifying unit 726. When receiving the synchronization message identifying information, the conflict determining unit 730 determines whether packet data included in one of the queues 734-1 to 734-k is output by the selector 736. For example, the conflict determining unit 730 determines whether the reading controller 728 has received the synchronization message identifying information within a period of time (reading period) from when the reading controller 728 outputs the selection control signal described above to the selector 736 to when the data reading performed by the selector 736 is terminated.

When packet data is being output from the selector 736 at a time when the conflict determining unit 730 has received the synchronization message identifying information, the conflict determining unit 730 determines that the synchronization message and the other packet data conflict with each other, and therefore, determines that waiting of a transmission of the synchronization message has occurred. On the other hand, when packet data is not being output from the selector 736 at a time when the conflict determining unit 730 has received the synchronization message identifying information, the synchronization message stored in the corresponding queue 734-1 does not affected by the other queues and is output from the selector 736. Accordingly, the conflict determining unit 730 determines that the synchronization message does not conflict with other packet data, and therefore, determines that waiting of a transmission of the synchronization message does not occur. The conflict determining unit 730 outputs conflict determining information representing presence or absence of conflict along with the received synchronization message identifying information to the relay time calculating unit 710 and the delay insertion controller 714 (the writing controller 742 and the reading controller 744).

Here, when the synchronization message conflicts with packet data which has arrived before the synchronization message, the synchronization message is stored in the corresponding queue 734-1 to wait completion of an output of the packet data from a corresponding one of the queues. Accordingly, an output of the synchronization message delays by the waiting time caused by the conflict. The delay of the output of the synchronization message affects a timing when the synchronization message is transmitted from the relaying apparatus 700. Therefore, when the conflict occurs, the synchronization message waits for a transmission of itself. The generation of the waiting time is not avoidable even when the output controller 706 performs the priority control process described above, and even when a high class priority level is set to the synchronization message, for example, the synchronization message is not allowed to be output until an output of packet data of a low priority level is completed if the packet data of the low priority level is being outputted. When packet data which has a priority level higher than that of the synchronization message exists, a waiting time caused by the conflict becomes longer owing to a waiting queue caused as a result of the priority control process and a transmission waiting time of the synchronization message becomes longer.

The synchronization message identifying unit 704 receives packet data stored in a reading target queue from the selector 736 and determines whether the received packet data is a synchronization message. The determination as to whether the received packet data is a synchronization message is performed similarly to the determination performed by the synchronization message identifying unit 702. When the received packet data is a synchronization message, the synchronization message identifying unit 704 extracts synchronization message identifying information included in the synchronization message and outputs the extracted synchronization message identifying information to the delay measuring unit 708. The extracted synchronization message identifying information is similar to that extracted by the synchronization message identifying unit 702.

The delay measuring unit 708 receives the synchronization message identifying information from the synchronization message identifying units 702-1 to 702-N and 704. The delay measuring unit 708 obtains a time point when the delay measuring unit 708 has received the synchronization message identifying information from the synchronization message identifying unit 702 and a time point when the delay measuring unit 708 has received the synchronization message identifying information from the synchronization message identifying unit 704 of the same synchronization message, and calculates a difference between the obtained two time points. In this way, the delay measuring unit 708 measures a delay time of the synchronization message caused by the output timing control performed by the output controller 706. The delay measuring unit 708 outputs delay time information representing the measured delay time to the relay time calculating unit 710 and the insertion delay calculating unit 712 in addition to the synchronization message identifying information of the corresponding synchronization message.

Note that the delay time measured by the delay measuring unit 708 includes a processing delay time corresponding to the minimum processing cycle which is a period of time in which the synchronization message is input through a corresponding one of the input ports, transmitted through the various units included in the output controller 706, and output to an output port and includes a conflict delay time caused by waiting of an output of the queue 734-1 corresponding to the synchronization message owing to the conflict of the synchronization message with other packet data which has arrived before the synchronization message. The processing delay time is not defined by characteristics of the units included in the output controller 706 and is a fixed value irrespective of an input synchronization message. However, the conflict delay time is not generated when a synchronization message and packet data do not conflict with each other, and a value of the conflict delay time considerably varies depending on a conflict state of a synchronization message when conflict occurs. The conflict delay time corresponds to the transmission waiting time of the synchronization message.

The relay time calculating unit 710 receives the conflict determination information and the corresponding synchronization message identifying information from the conflict determining unit 730 and receives the delay time information and the corresponding synchronization message identifying information from the delay measuring unit 708. The relay time calculating unit 710 calculates a setting value (relay time setting value) of a relay time for the synchronization message which is involved in conflict in accordance with the received delay time information. For example, the relay time calculating unit 710 obtains the maximum value of the delay time measured within a measuring time which is determined in advance as the relay time setting value as described below. The relay time calculating unit 710 outputs relay time information representing the obtained relay time setting value to the insertion delay calculating unit 712.

Figure 9A:
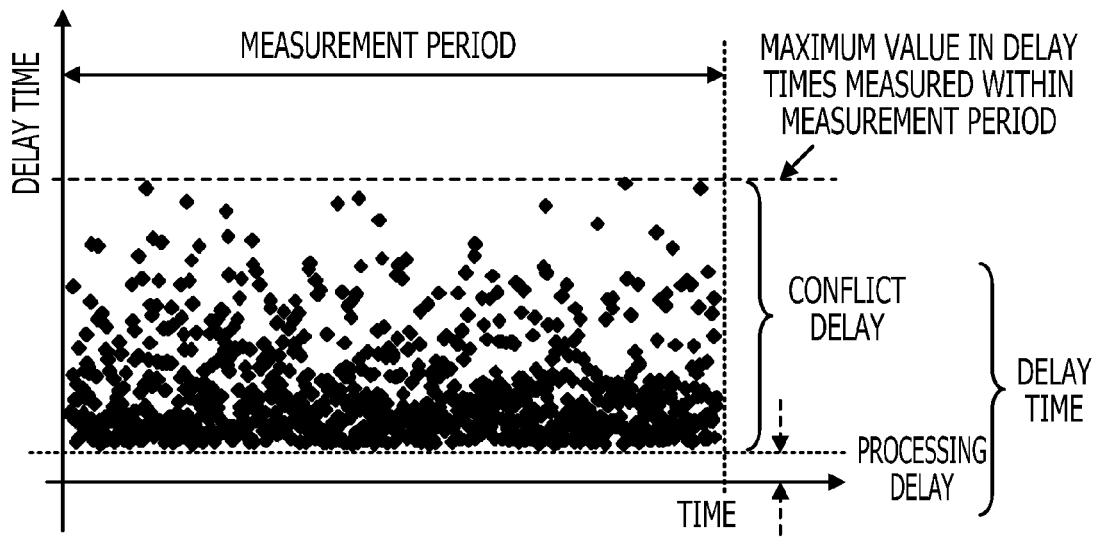
FIGS. 9A and 9B are diagrams illustrating a process of calculating a relay time setting value in a relay time calculation unit 710.
Figure 9B:
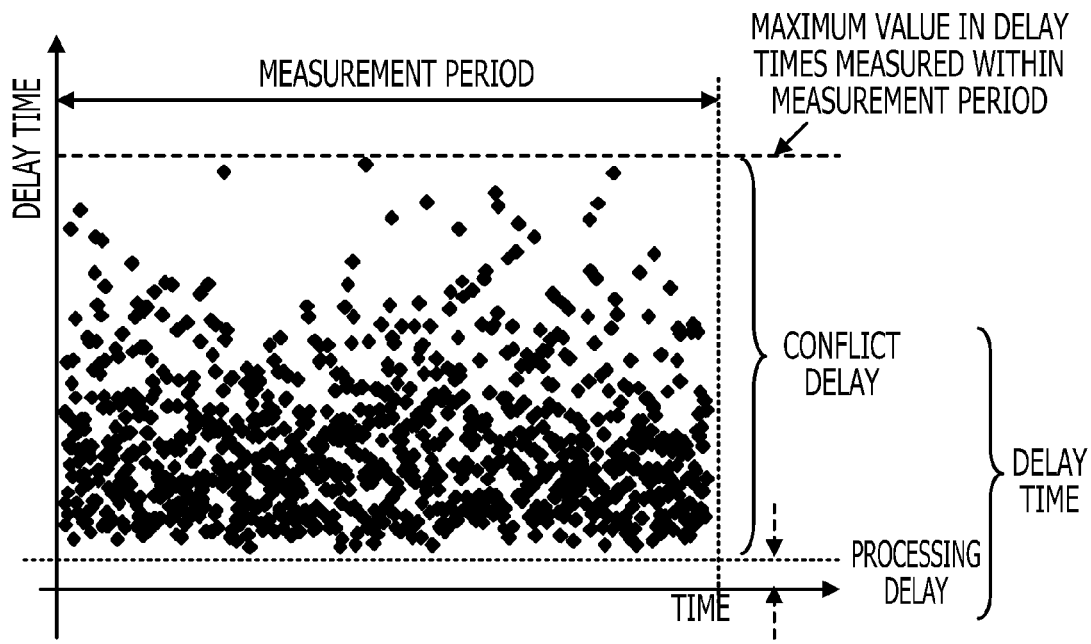

FIGS. 9A and 9B are diagrams illustrating a process of calculating a relay time setting value in the relay time calculation unit 710. FIG. 9A illustrates a case where a band of conflict traffic is small. FIG. 9B illustrates a case where a band of conflict traffic is large.

In the examples in FIGS. 9A and 9B, the relay time calculating unit 710 sets a period of time in which a delay time is measured in advance, and then the relay time calculating unit 710 receives a plurality of delay time information corresponding to a plurality of synchronization messages from the delay measuring unit 708 within the set measurement period so as to collect a certain amount of delay time data including a delay time value. Furthermore, FIGS. 9A and 9B are graphs illustrating delay time data collected by the relay time calculating unit 710.

The relay time calculating unit 710 calculates the maximum value in delay time values measured by the delay measuring unit 708 within the measurement period in accordance with the collected delay time data and sets the obtained delay time maximum value as a relay time setting value.

As is apparent from FIGS. 9A and 9B, the relay time setting value calculated by the relay time calculating unit 710 varies depending on a width of a band of conflict traffic of the relaying apparatus 700. For example, when the band of the conflict traffic is small, distribution of the conflict delay times becomes narrow in the delay time data, and in addition, the maximum value of the conflict delay times becomes small. Accordingly, the relay time setting value becomes smaller. On the other hand, when the band of the conflict traffic is large, distribution of the conflict delay times becomes large in the delay time data, and in addition, the maximum value of the conflict delay times becomes large. Accordingly, the relay time setting value becomes larger.

As described above, since the relay time calculating unit 710 sets the optimum relay time setting value corresponding to the conflict state of the synchronization message, the comparatively large relay time setting value is set so that a certain margin is ensured, and a setting of an unnecessarily large value is avoided.

The insertion delay calculating unit 712 receives the relay time information representing the relay time setting value from the relay time calculating unit 710 and receives the delay time information and the corresponding synchronization message identifying information from the delay measuring unit 708. The insertion delay calculating unit 712 calculates a value of an insertion delay time of the synchronization message corresponding to the received synchronization message identifying information in accordance with the relay time setting value represented by the received relay time information and the delay time represented by the received delay time information. For example, the insertion delay calculating unit 712 obtains a difference between the relay time setting value and the delay time associated with the synchronization message corresponding to the synchronization message identifying information as the value of the insertion delay time. For example, the insertion delay time is obtained in accordance with Expression (2) below.

$$\text{Insertion Delay Time} = \text{Relay Time Setting Value} - \text{Delay Time} = \quad (2)$$
$$\text{Relay Time Setting Value} -$$
$$\text{Processing Delay Time} - \text{Conflict Delay Time}$$

The insertion delay calculating unit 712 outputs insertion delay information representing the obtained insertion delay time to the delay insertion controller 714 (reading controller 744).

When the value of the delay time measured by the delay measuring unit 708 is larger than the relay time setting value set by the relay time calculating unit 710 and the value of the insertion delay time obtained in accordance with Expression (2) is a negative value, the insertion delay calculating unit 712 determines discarding of the corresponding synchronization message. When determining the discarding of the synchronization message, the insertion delay calculating unit 712 outputs information representing an instruction for discarding the synchronization message as insertion delay information to the reading controller 744 instead of information on the obtained insertion delay time.

The delay insertion controller 714 has a function of a transmitter which transmits packet data including a synchronization message through an output port. In the delay insertion controller 714, the writing controller 742 receives, from the synchronization message identifying unit 704, the packet data including the synchronization message which has been output from the selector 736, and receives the conflict determination information and the corresponding synchronization message identifying information from the conflict determining unit 730. The writing controller 742 stores the received packet data in the bypass queue 748 for synchronization messages, the delay insertion queue 750 for synchronization messages, or the timing controlling queue 752 for packets in accordance with presence or absence of conflict represented by the conflict determination information and the synchronization message identifying information. The writing controller 742 outputs packet identifying information and packet length information of the packet data to be stored, and queue identifying information of a queue which is a destination of the storage of the packet data to the reading controller 744.

When the received packet data is a synchronization message and the received conflict determination information represents that conflict has not occurred, the writing controller 742 stores the received synchronization message in the bypass queue 748. When the received packet data is a synchronization message and the received conflict determination information represents that conflict has occurred, the writing controller 742 stores the received synchronization message in the delay insertion queue 750. When the received packet data is not a synchronization message, the writing controller 742 stores the received packet data in the timing controlling queue 752.

The reading controller 744 receives the conflict determination information and the corresponding synchronization message identifying information from the conflict determining unit 730 and receives the insertion delay information from the insertion delay calculating unit 712. The reading controller 744 receives the packet identifying information, the packet length information, and the queue identifying information from the writing controller 742.

When the received conflict determination information represents that conflict has not occurred, the reading controller 744 determines the bypass queue 748 as a reading target queue. The reading controller 744 outputs queue identifying information of the bypass queue 748, selection control information including the packet identifying information of the synchronization message to be read, and an instruction for reading the data stored in the queue to the selector 754 after receiving the information described above from the writing controller 742 and the minimum processing cycle is elapsed.

The selector 754 receives the selection control information and the reading instruction from the reading controller 744 and outputs the synchronization message stored in the bypass queue 748 to the output port in accordance with the received selection control information and the received reading instruction. For example, the synchronization message stored in the bypass queue 748 is output without delay in the minimum processing cycle under control of the reading controller 744.

Accordingly, since a delay is not inserted by the delay insertion controller 714 when the received synchronization message and other packet data do not conflict with each other, a relay time of the relaying apparatus 700 is substantially the similar to the processing delay time described above.

On the other hand, when the received conflict determination information represents that conflict has occurred, the reading controller 744 determines the delay insertion queue 750 as a reading target queue. After receiving the information described above from the writing controller 742, the reading controller 744 outputs queue identifying information of the delay insertion queue 750, selection control information including the packet identifying information of the synchronization message to be read, and an instruction for reading data stored in the queue to the selector 754 at a timing delayed by the processing cycle corresponding to the insertion delay time represented by the received insertion delay information.

The selector 754 receives the selection control information and the reading instruction from the reading controller 744 and outputs the synchronization message stored in the delay insertion queue 750 to the output port in accordance with the received selection control information and the received reading instruction. For example, the synchronization message stored in the delay insertion queue 750 is output at an output timing which is delayed by the processing cycle corresponding to the insertion delay time under control of the reading controller 744.

Accordingly, since a delay is inserted by the delay insertion controller 714 so that the entire relay time of the relaying apparatus 700 becomes equal to the relay time setting value obtained by the relay time calculating unit 710 when the received synchronization message and other packet data conflict with each other, the relay time of the relaying apparatus 700 is substantially the similar to the relay time setting value obtained by the relay time calculating unit 710.

Note that, when the received insertion delay information represents an instruction for discarding the synchronization message, the reading controller 744 determines discarding of the synchronization message stored in the delay insertion queue 750. The reading controller 744 outputs the queue identifying information of the delay insertion queue 750, the selection control information including the packet identifying information of the synchronization message to be discarded, and an instruction for discarding the data stored in the queue to the selector 754.

The selector 754 receives the selection control information and the reading instruction from the reading controller 744 and discards the synchronization message stored in the delay insertion queue 750 in accordance with the received selection control information and the received discarding instruction. For example, the synchronization message stored in the delay insertion queue 750 is not output to the output port.

Note that the reading controller 744 determines that the timing controlling queue 752 as a reading target queue when packet data other than the synchronization message is stored in the timing controlling queue 752. The packet data stored in the timing controlling queue 752 is output under control of the reading controller 744 when a synchronization message is not output from the bypass queue 748 and the delay insertion queue 750.

As described above, the delay insertion controller 714 of the relaying apparatus 700 optimizes the delay time to be inserted into the relay of the synchronization message in accordance with presence or absence of conflict of the synchronization message with the other packet data or a degree of the conflict, and sets the relay time of the synchronization message to an optimum fixed value in accordance with the presence or absence of the conflict. For example, when the conflict of the synchronization message with other packet data has not occurred, the delay insertion controller 714 does not insert a delay and makes the relay time be equal to the processing delay time which is the minimum relay time of the relaying apparatus 700 whereas when the conflict has occurred, the delay insertion controller 714 inserts an optimized delay so as to make the relay time be equal to the minimum relay time setting value obtained by the relay time calculating unit 710. Accordingly, in the relaying apparatus 700, unnecessarily long relay time of the synchronization message is avoided and variation of the relay time is absorbed.

Consequently, when a time synchronization process is performed by the slave apparatus in accordance with the IEEE1588 time synchronization method illustrated in FIG. 1, influence of a frequency deviation of an oscillator included in the slave apparatus may be reduced without using an expensive oscillator and reliability of the time synchronization process performed by the slave apparatus is improved.

Figure 12A:
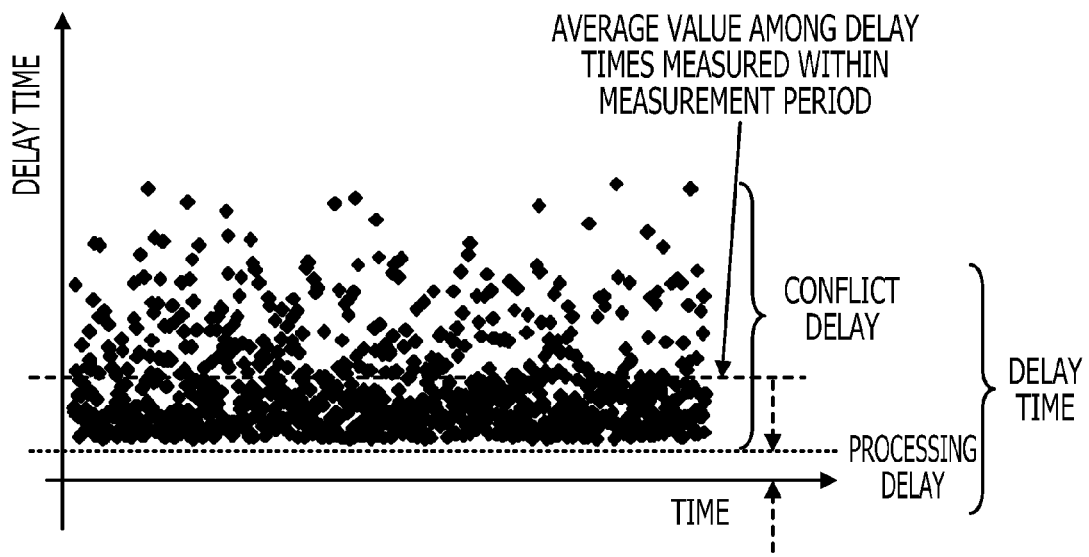
FIGS. 12A and 12B are diagrams illustrating another process of calculating a relay time setting value in the relay time calculation unit 710.

For example, when a band of conflict traffic is small as illustrated in FIGS. 9A and 12A, the probability of occurrence of a case where conflict does not occur when a synchronization message is received is large, and therefore, the relaying apparatus 700 transmits a relatively large number of synchronization messages to the slave apparatus in a state in which relay times are made equal to the processing delay time which is the minimum relay time of the relaying apparatus 700. The relaying apparatus 700 also transmits a synchronization message which conflicts with other packet data to the slave apparatus in a state in which a relay time is made equal to the minimum relay time setting value.

Here, the slave apparatus exchanges a given number of messages with the master apparatus and calculates time offset amounts for the exchanged synchronization messages. By this, the slave apparatus obtains the time offset amounts corresponding to a given number of samples and performs statistical processing and the like on the samples of the obtained time offset amounts so as to determine a time offset amount to be used in a time synchronization process.

Accordingly, when the band of conflict traffic is small, conflict does not occur and the number of samples of the time offset amounts calculated in accordance with synchronization messages corresponding to the smaller relay times is increased. Therefore, in the slave apparatus, influence of a frequency deviation of an oscillator included in the slave apparatus may be more efficiently reduced without using an expensive oscillator and reliability of the time synchronization process performed by the slave apparatus is improved.

Furthermore, when the relay time setting value is set to the maximum delay time, the relay time setting value is larger than that in a case where the relay time is set to an average value which will be described hereinafter. Therefore, the number of synchronization messages determined to be discarded by the insertion delay calculating unit 712 since values of insertion delay times thereof calculated in accordance with Expression (2) are negative values is reduced. Accordingly, the relaying apparatus transmits a larger number of synchronization messages to the master apparatus and the slave apparatus while the variation of the relay times is absorbed. Here, as described hereinafter, the slave apparatus performs statistical processing and the like on the samples of the obtained time offset amounts so as to determine a time offset amount to be used in a time synchronization process.

Here, as described above, the slave apparatus performs the statistical processing and the like on the samples of a given number of obtained time offset amounts so as to determine a time offset amount to be used in the time synchronization process.

Accordingly, when the relay time setting value is set to the maximum delay time in the relaying apparatus, a time offset amount used in the time synchronization process is determined in the slave apparatus in accordance with a larger number of synchronization message samples. Consequently, reliability of the time synchronization process performed by the slave apparatus is improved.

Figure 10:
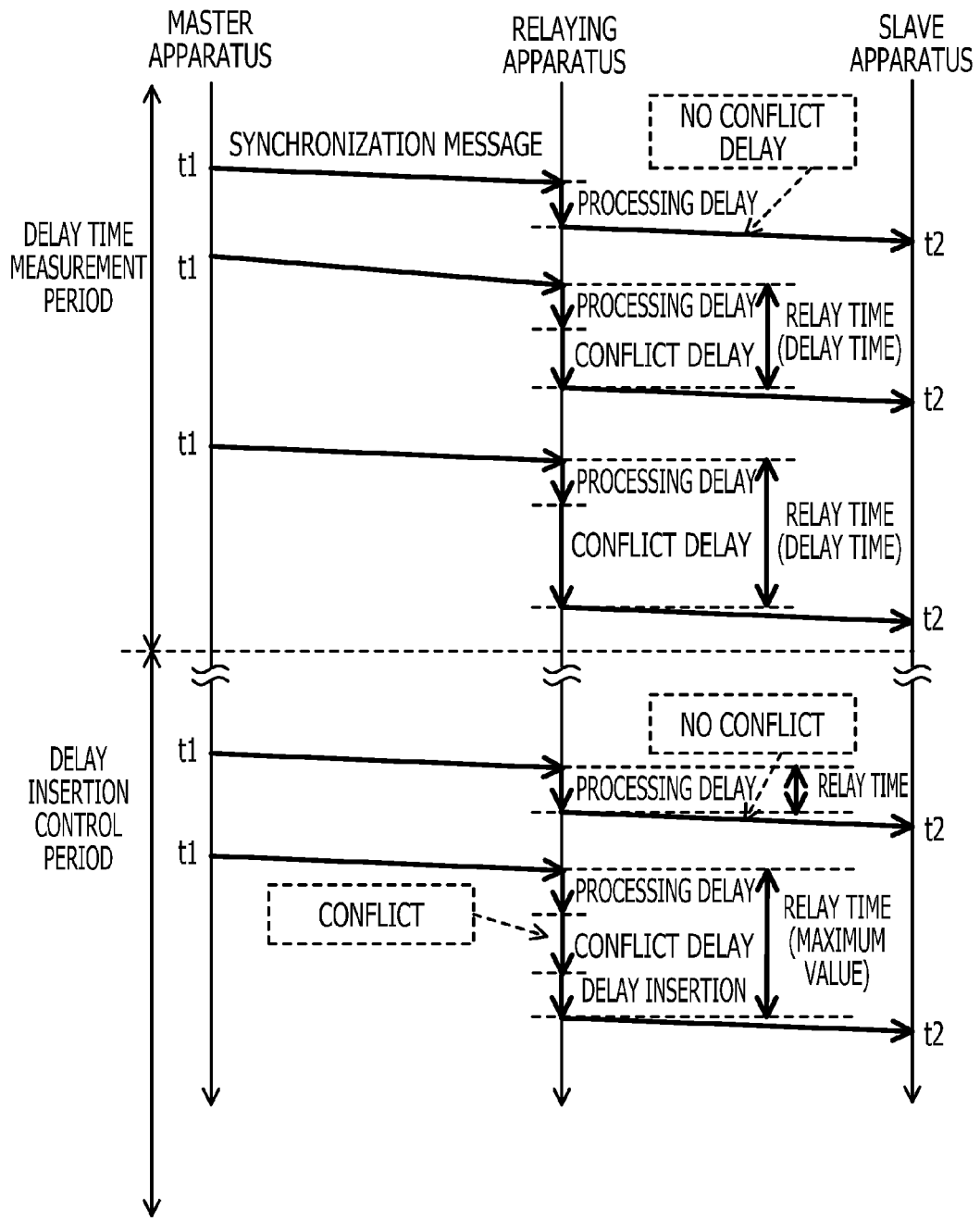
FIG. 10 is a diagram illustrating a delay insertion control process performed by the relaying apparatus 700.

FIG. 10 is a diagram illustrating the delay insertion control process performed by the relaying apparatus 700.

As illustrated in FIG. 10, when the relaying apparatus 700 starts operation, first, a delay time measurement period is started.

In the delay time measurement period, the relaying apparatus 700 measures delay times of synchronization messages received by the input ports using the delay measuring unit 708. As is apparent from FIG. 10, the delay times of the synchronization messages are different from one another depending on presence or absence of conflict. When conflict does not occur, a conflict delay time is not generated, and therefore, a short delay time is obtained. On the other hand, when conflict occurs, a length of the delay time is varied in accordance with a length of a generated conflict delay time.

Then the relaying apparatus 700 collects the measured different delay times using the relay time calculating unit 710 and calculates the maximum value in the collected delay times. The relay time calculating unit 710 sets the obtained maximum delay time as a relay time setting value.

Note that, in the delay time measurement period, since the relaying apparatus 700 does not perform the delay insertion control process, the delay insertion controller 714 does not use the delay insertion queue 750, and all the synchronization messages are output to the output port through the bypass queue 748.

After the delay time measurement period is terminated, a delay insertion control period is entered.

In the delay insertion control period, the relaying apparatus 700 performs the delay insertion control process using the delay insertion controller 714 in accordance with the relay time setting value obtained by the relay time calculating unit 710. The relaying apparatus 700 causes the insertion delay calculating unit 712 to calculate insertion delay times of the synchronization messages in accordance with the obtained relay time setting value.

As illustrated in FIG. 10, when a synchronization message is not involved in conflict, the relaying apparatus 700 does not insert a delay to a relay of the synchronization message and sets a processing delay time of the relaying apparatus 700 as a relay time. On the other hand, when conflict occurs, the relaying apparatus 700 inserts the insertion delay time calculated by the insertion delay calculating unit 712 to the relay of the synchronization message so as to set the relay time setting value calculated by the relay time calculating unit 710 as the relay time. For example, the relaying apparatus 700 sets the different fixed values as the relay times in accordance with presence or absence of conflict of the synchronization messages.

Note that, the delay time measurement period is preferably set not at a time immediately after the relaying apparatus 700 starts operating but also in a certain cycle. When the delay time measurement period is set in a certain cycle, the relay time setting value may be periodically updated, and even when a conflict state in the relaying apparatus 700 changes with time, the relay time setting value may be maintained as an optimum value corresponding to the conflict state.

Consequently, even when the conflict state is changed, an unnecessarily long relay time of the relaying apparatus 700 may be avoided, and influence of a frequency deviation of an oscillator included in the slave apparatus may be reduced without using an expensive oscillator and reliability of the time synchronization process performed by the slave apparatus is improved.

Note that, although a case where a synchronization message is transmitted from the master apparatus to the slave apparatus is illustrated in FIG. 10, the relaying apparatus 700 performs a similar delay insertion control process even in a case where a synchronization message is transmitted from the slave apparatus to the master apparatus.

Here, the time synchronization process performed by the slave apparatus will be described with reference to FIGS. 1 and 10.

The slave apparatus calculates a time offset amount by Expression (1) in accordance with the time synchronization method conforming to the IEEE1588 described with reference to FIG. 1 and executes the time synchronization process in accordance with the obtained time offset amount.

On the other hand, as described with reference to FIG. 10, the relay time of the relaying apparatus 700 is a fixed value which varies in accordance with presence or absence of conflict of the synchronization message. For example, when conflict has not occurred, the relay time is fixed to the processing delay time whereas when conflict has occurred, the relay time is fixed to the relay time setting value which is larger than the processing delay time.

Therefore, in FIG. 1, when a conflict state of a synchronization message transmitted from the master apparatus to the slave apparatus and a conflict state of a synchronization message transmitted from the slave apparatus to the master apparatus are different from each other in FIG. 1, relay times of both of the synchronization messages in the relaying apparatus 700 are different from each other, and at least a measurement error corresponding to a difference between the relay time setting value and the processing delay time value is generated between the transmission time t-ms of the transmission from the master apparatus to the slave apparatus and the transmission time t-sm of the transmission from the slave apparatus to the master apparatus. For example, this occurs in a case where, among PTP messages (synchronization messages), a Sync message which is transmitted from the master apparatus to the slave apparatus is not involved in conflict but a Delay-Req message which is transmitted from the slave apparatus to the master apparatus is involved in conflict.

Accordingly, in the slave apparatus, a time offset amount is not reliably calculated in accordance with Expression (1) due to the measurement error between the transmission time t-ms and the transmission time t-sm.

Therefore, the slave apparatus determines whether the conflict state of the synchronization message transmitted from the master apparatus to the slave apparatus and the conflict state of the synchronization message transmitted from the slave apparatus to the master apparatus are the similar to each other. When the conflict states are the similar to each other, a time offset amount is calculated whereas when the conflict states are different from each other, a time offset amount is not calculated. Then the slave apparatus executes the time synchronization process in accordance with the time offset amount obtained when the conflict states of both of the synchronization messages are the similar to each other.

Note that the slave apparatus monitors a difference value between the transmission time t-ms and the transmission time t-sm, for example, and when the difference value is larger than a given threshold value, the slave apparatus determines that the conflict states are different from each other and the time offset amount is not calculated.

By this, since the slave apparatus exchanges a given number of synchronization messages with the master apparatus, the slave apparatus obtains the time offset amounts corresponding to a given number of samples and performs statistical processing and the like on the samples of the obtained time offset amounts so as to determine a time offset amount to be used in the time synchronization process. Accordingly, even if the slave apparatus does not calculate time offset amounts of some of the synchronization messages, the time synchronization process is less affected as long as the slave apparatus obtains time offset amounts corresponding to a statistically sufficient number of samples.

Figure 11:
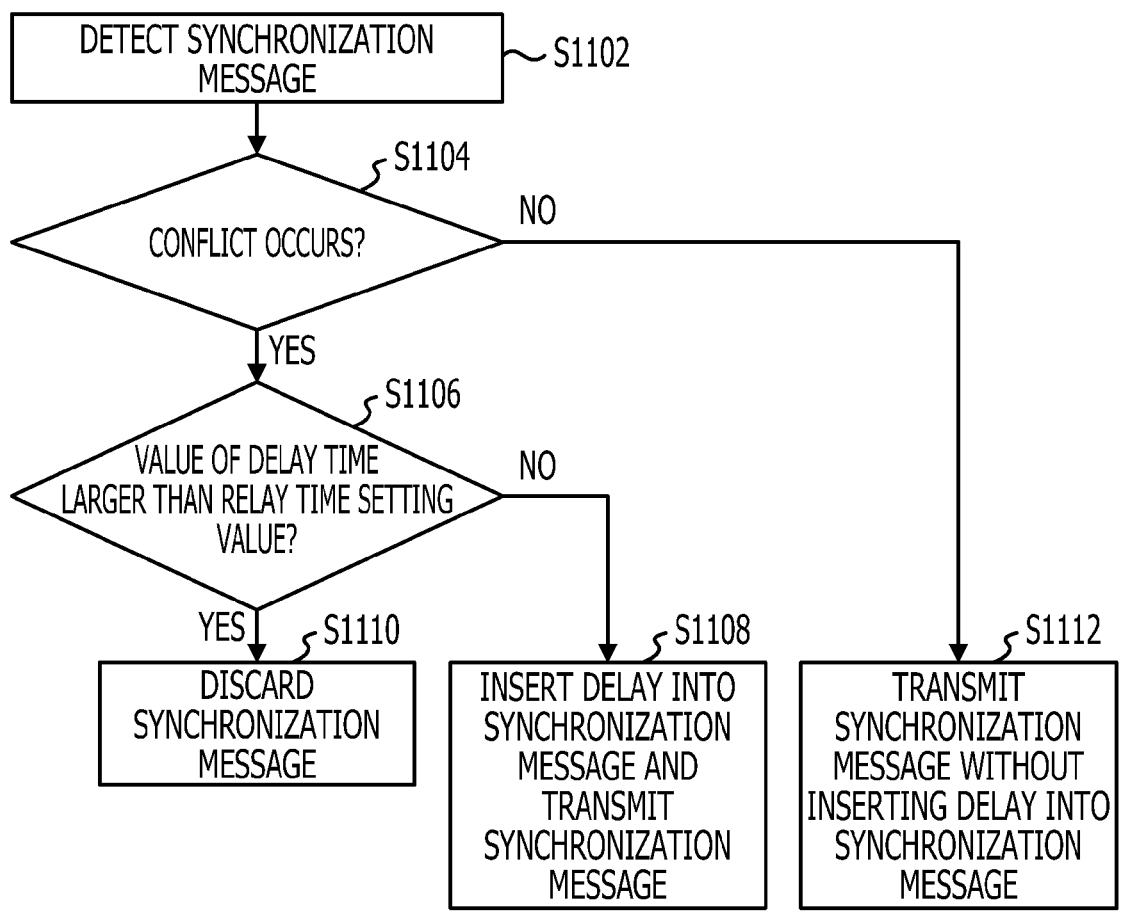
FIG. 11 is a flowchart illustrating a process of relaying a synchronization message performed by the relaying apparatus 700.

FIG. 11 is a flowchart illustrating a process of relaying a synchronization message performed by the relaying apparatus 700. The process of relaying a synchronization message illustrated in FIG. 11 is executed by the synchronization message identifying units 702 and 704, the output controller 706, the delay measuring unit 708, the relay time calculating unit 710, the insertion delay calculating unit 712, and the delay insertion controller 714 included in the relaying apparatus 700 in combination.

First, in step S1102, the synchronization message identifying units 702-1 to 702-N included in the relaying apparatus 700 detect a synchronization message by determining input packet data as a synchronization message.

Next, in step S1104, the conflict determining unit 730 of the output controller 706 determines whether the synchronization message detected in step S1102 conflicts with other packet data. When the determination is affirmative, the process proceeds to step S1106 whereas when the determination is negative, the process proceeds to step S1112.

Next, in step S1106, the delay measuring unit 708 measures a delay time of the synchronization message detected in step S1102 which is caused by the output timing control performed by the output controller 706. The delay time measured by the delay measuring unit 708 includes a processing delay time and a conflict delay time. The processing delay time is a fixed value irrespective of an input synchronization message. However, when the synchronization message does not conflict with other packet data, the conflict delay time is not generated whereas when the conflict occurs, a value of the conflict delay time considerably varies depending on a conflict state of the synchronization message.

The relay time calculating unit 710 calculates a relay time setting value in accordance with the delay time measured by the delay measuring unit 708. For example, the relay time calculating unit 710 calculates the maximum value of delay times measured within a measurement period which is determined in advance as the relay time setting value.

Then the insertion delay calculating unit 712 calculates a value of an insertion delay time of the synchronization message detected in step S1102 in accordance with the relay time setting value calculated by the relay time calculating unit 710 and the delay time measured by the delay measuring unit 708. For example, the insertion delay calculating unit 712 calculates a difference between the relay time setting value and the value of the delay time as the value of the insertion delay time in accordance with Expression (2) above. Furthermore, the insertion delay calculating unit 712 determines whether the obtained value of the insertion delay time is a negative value, that is, whether the value of the delay time is larger than the relay time setting value. When the determination is affirmative, the process proceeds to step S1110 and otherwise the process proceeds to step S1108.

Subsequently, in step S1108, the delay insertion controller 714 stores the synchronization message detected in step S1102 in the delay insertion queue 750 before reading the synchronization message at a timing which is delayed by the insertion delay time calculated by the insertion delay calculating unit 712 and transmitting the synchronization message through the output port. In this case, the relay time in the relaying apparatus 700 is substantially the similar to the relay time setting value calculated by the relay time calculating unit 710.

In step S1110, the delay insertion controller 714 determines that the synchronization message detected in step S1102 is to be discarded and does not output the synchronization message stored in the delay insertion queue 750 to the output port.

On the other hand, in step S1112, the delay insertion controller 714 stores the synchronization message detected in step S1102 in the bypass queue 748 before reading the synchronization message without delay and outputting the synchronization message through the output port. In this case, the relay time in the relaying apparatus 700 is substantially the similar to the processing delay time.

As described above, according to the process of relaying a synchronization message illustrated in FIG. 11, since execution of delay insertion is determined in accordance with presence or absence of conflict of a synchronization message, a relay time of the synchronization message may be set as an optimum fixed value in accordance with the presence or absence of conflict, an unnecessarily long relay time may be avoided, and variation of the relay time is absorbed.

Consequently, when time synchronization processing is performed by the slave apparatus in accordance with the IEEE1588 time synchronization method illustrated in FIG. 1, influence of a frequency deviation of an oscillator included in the slave apparatus may be reduced without using an expensive oscillator and reliability of the time synchronization processing performed by the slave apparatus is improved.

Figure 12B:
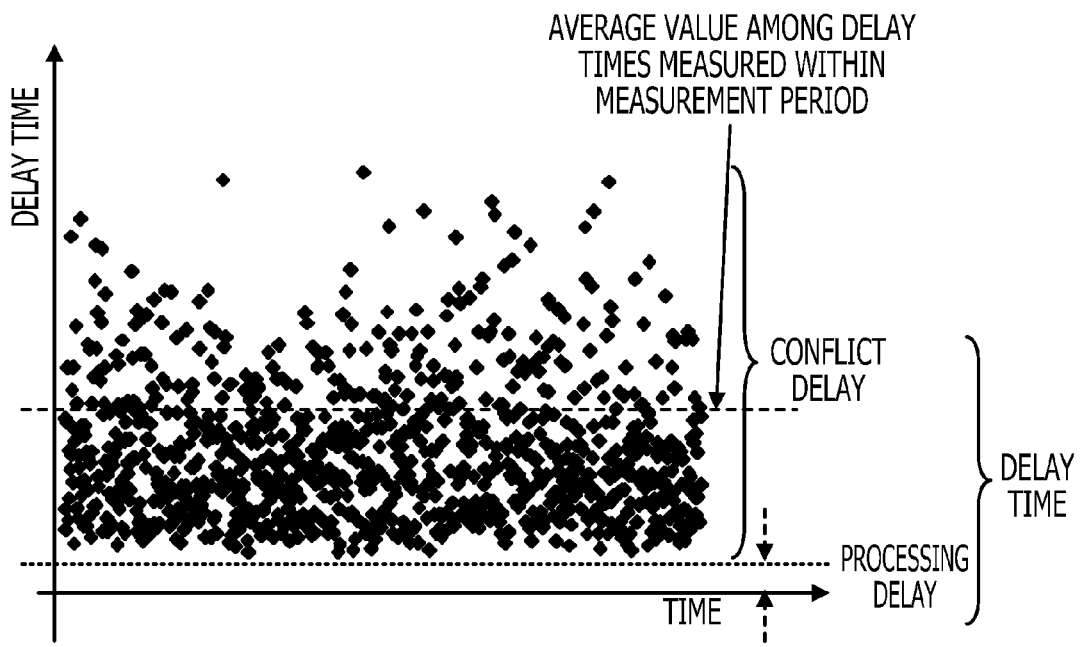

FIGS. 12A and 12B are diagrams illustrating another process of calculating a relay time setting value in the relay time calculation unit 710. FIG. 12A illustrates a case where a band of conflict traffic is small. FIG. 12B illustrates a case where a band of conflict traffic is large.

In the examples of FIGS. 9A and 9B, the relay time calculating unit 710 calculates the maximum value of values of delay times measured by the delay measuring unit 708 within a given measurement period. However, in the examples of FIGS. 12A and 12B, the relay time calculating unit 710 calculates an average value of values of delay times measured by the delay measuring unit 708 within a given measurement period.

For example, in the examples of in FIGS. 12A and 12B, the relay time calculating unit 710 receives a plurality of delay time information corresponding to a plurality of synchronization messages from the delay measuring unit 708 within a given measurement period so as to collect a certain amount of delay time data including delay time values. The relay time calculating unit 710 calculates the average value in the delay time values measured by the delay measuring unit 708 within the measurement period in accordance with the collected delay time data and sets the obtained delay time average value as a relay time setting value.

As is apparent from FIGS. 12A and 12B, the relay time setting value calculated by the relay time calculating unit 710 varies depending on a width of a band of conflict traffic of the relaying apparatus 700. For example, when the band of the conflict traffic is narrow, distribution of the conflict delay times becomes narrow in the delay time data, and in addition, the average value of the conflict delay times becomes small. Accordingly, the relay time setting value becomes small. On the other hand, when the band of the conflict traffic is wide, distribution of the conflict delay times becomes large in the delay time data, and in addition, the average value of the conflict delay times becomes large. Accordingly, the relay time setting value becomes large.

Figure 13:
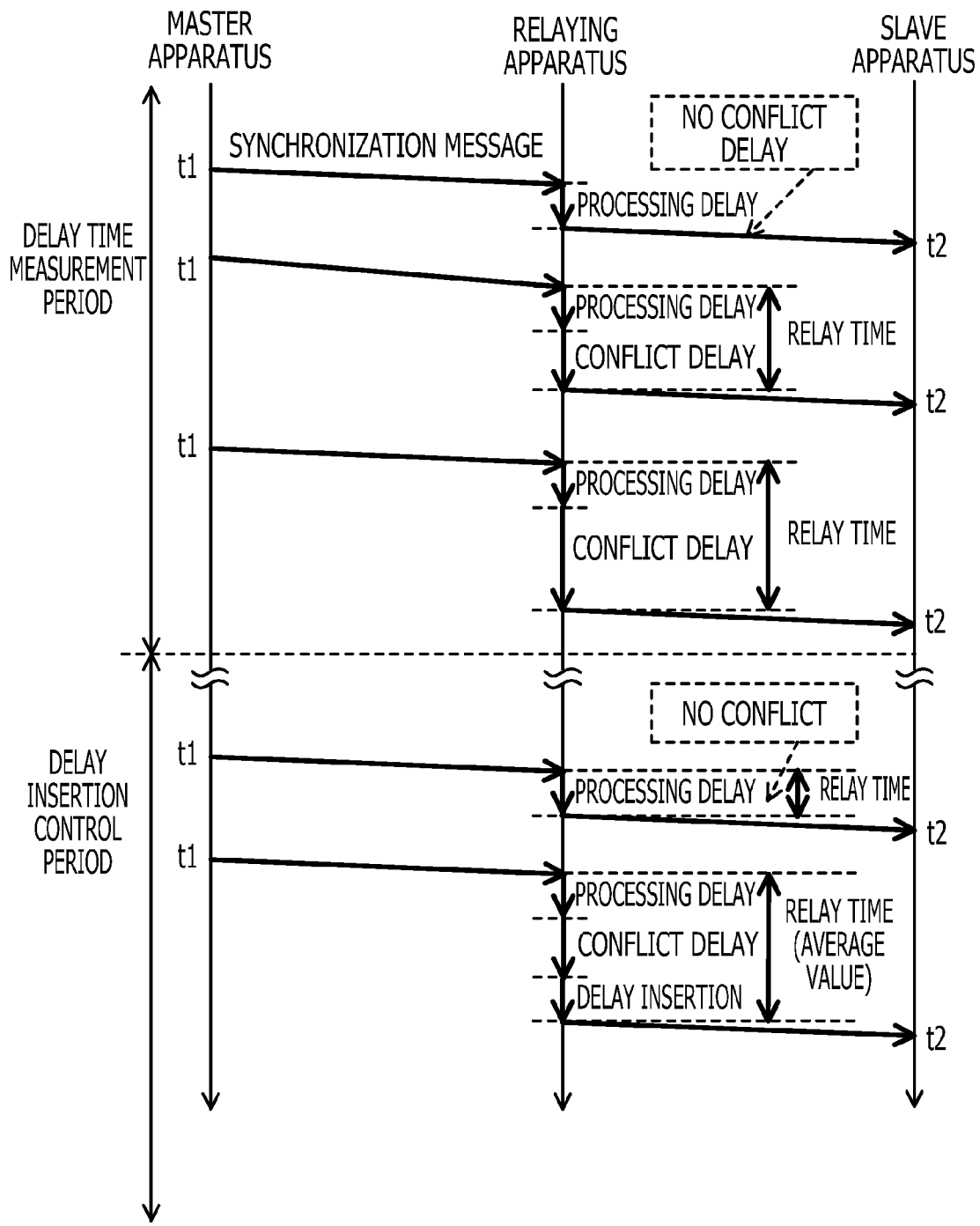
FIG. 13 is a diagram illustrating another delay insertion control process performed by the relaying apparatus 700.

FIG. 13 is a diagram illustrating the delay insertion control process performed by the relaying apparatus 700. The example of FIG. 13 is different from the example of FIG. 10 in that, although the maximum value of the measured delay times is set to the relay time setting value in the example of FIG. 10, the average value of the measured delay times is set to the relay time setting value in the example of FIG. 13.

In the example of FIG. 13, as with the case of FIG. 10, in the delay time measurement period, the relaying apparatus 700 measures delay times of synchronization messages received by the input ports using the delay measuring unit 708. Then the relaying apparatus 700 collects the different measured delay times using the relay time calculating unit 710 and calculates the average value among the collected delay times. The relay time calculating unit 710 sets the obtained average delay time as a relay time setting value.

Subsequently, in the delay insertion control period, the relaying apparatus 700 performs the delay insertion control process using the delay insertion controller 714 in accordance with the delay time setting value obtained by the relay time calculating unit 710. The relaying apparatus 700 causes the insertion delay calculating unit 712 to calculate insertion delay times of the synchronization messages in accordance with the obtained relay time setting value. As illustrated in FIG. 13, the relaying apparatus 700 sets the relay times to fixed values of the processing delay time or the relay time setting value in accordance with presence or absence of conflict of the synchronization messages.

Note that, although a case where the synchronization messages are transmitted from the master apparatus to the slave apparatus is illustrated in FIG. 13, the relaying apparatus 700 performs a similar delay insertion control process even in a case where synchronization messages are transmitted from the slave apparatus to the master apparatus.

As described above, even when the average value of the measured delay times is set to the relay time setting value, the relay time calculating unit 710 sets the optimum relay time setting value corresponding to the conflict state of the synchronization message, and therefore, a comparatively large relay time setting value is set so as to have a certain margin and a setting of an unnecessarily large value is avoided.

Furthermore, when the average delay time is set to the relay time setting value, the relay time setting value is set to a smaller value compared with the case where the maximum value is set to the relay time setting value. Accordingly, the relay time of the relaying apparatus is fixed to a short time while variation of the relay time is absorbed.

In this way, since a message transmission time between the master apparatus and the slave apparatus is made small, when the time synchronization processing is performed by the slave apparatus in accordance with the IEEE1588 time synchronization method illustrated in FIG. 1, influence of frequency deviation of an oscillator included in the slave apparatus may be reduced without using an expensive oscillator and reliability of the time synchronization processing performed by the slave apparatus is improved.

Hereinafter, various modifications of the relaying apparatus 700 of the first embodiment will be described.

The conflict determining unit 730 may determine, when the conflict determining unit 730 receives synchronization message identifying information from the synchronization message identifying unit 726 and even when packet data is being output from the selector 736, that is, even when conflict occurs, that a synchronization message and other packet data do not conflict with each other when a waiting time of the synchronization message which is caused by the conflict is smaller than a given threshold value.

For example, the conflict determining unit 730 determines, when a period of time from when the reading controller 728 outputs a selection control signal to the selector 736 to when the reading controller 728 receives the synchronization message identifying information is larger than a given conflict determination period, that conflict has not occurred irrespective of whether the selector 736 outputs packet data. Here, the conflict determination period is set smaller than the reading period described above.

This is because, if a conflict delay time generated by a waiting time of a synchronization message when the slave apparatus calculates a time offset amount in accordance with Expression (1) is within an allowable range as a measurement error of the transmission time t-ms or the transmission time t-sm, a relay time becomes unnecessarily long when a delay is inserted by the delay insertion controller 714.

When the relay time setting value is periodically updated since a delay time measurement period is periodically set, the relay time calculating unit 710 may calculate, a difference between a delay time value (relay time updated value) calculated by the delay measuring unit 708 in accordance with measured delay times and a current value of a relay time setting value. When the obtained difference is larger than a given threshold value, the relay time setting value may be updated by the obtained updated value.

The relay time calculating unit 710 may determine a possible value of the relay time setting value as a discrete value in advance and set the relationship between a delay time value calculated in accordance with the delay times measured by the delay measuring unit 708 and a relay time setting value which is actually set as a step function. In this case, when the relay time setting value is periodically updated since a delay time measurement period is periodically set, the relay time calculating unit 710 does not use the calculated delay time value as an updated value of the relay time setting value but increases the relay time setting value in accordance with the set step function when the calculated delay time value is increased.

In the two cases described above, if an amount of a change from the current value to the updated value of the calculated relay time setting value is small when the relay time calculating unit 710 updates the relay time setting value, the relay time setting value is not changed but fixed to the same value and the relay time of the relaying apparatus 700 is fixed to the same value and set stable.

By this, when the slave apparatus calculates a time offset amount using Expression (1) in accordance with the time synchronization method conforming to the IEEE1588 illustrated in FIG. 1, a measurement difference between the transmission time t-ms and the transmission time t-sm may be made small and a calculation error of the time offset amount may be made small. Accordingly, when performing the time synchronization process, the slave apparatus may accurately calculates the time offset value with ease and reliability of the time synchronization process performed by the slave apparatus is improved.

Furthermore, although the relay time calculating unit 710 calculates the maximum value or the average value of the delay times measured within the measurement period as the relay time setting value according to the examples illustrated in FIGS. 9A, 9B, 12A, and 12B, a method for calculating a relay time setting value is not limited to this. The relay time calculating unit 710 may set a value obtained by further performing a given calculation process on the maximum value or the average value of the delay times measured within the measurement period as the relay time setting value, and for example, a value corresponding to 80 percents of the maximum value of the delay times may be set as the relay time setting value.

Hereinafter, a relaying apparatus and a relaying method according to a second embodiment will be described.

Figure 14:
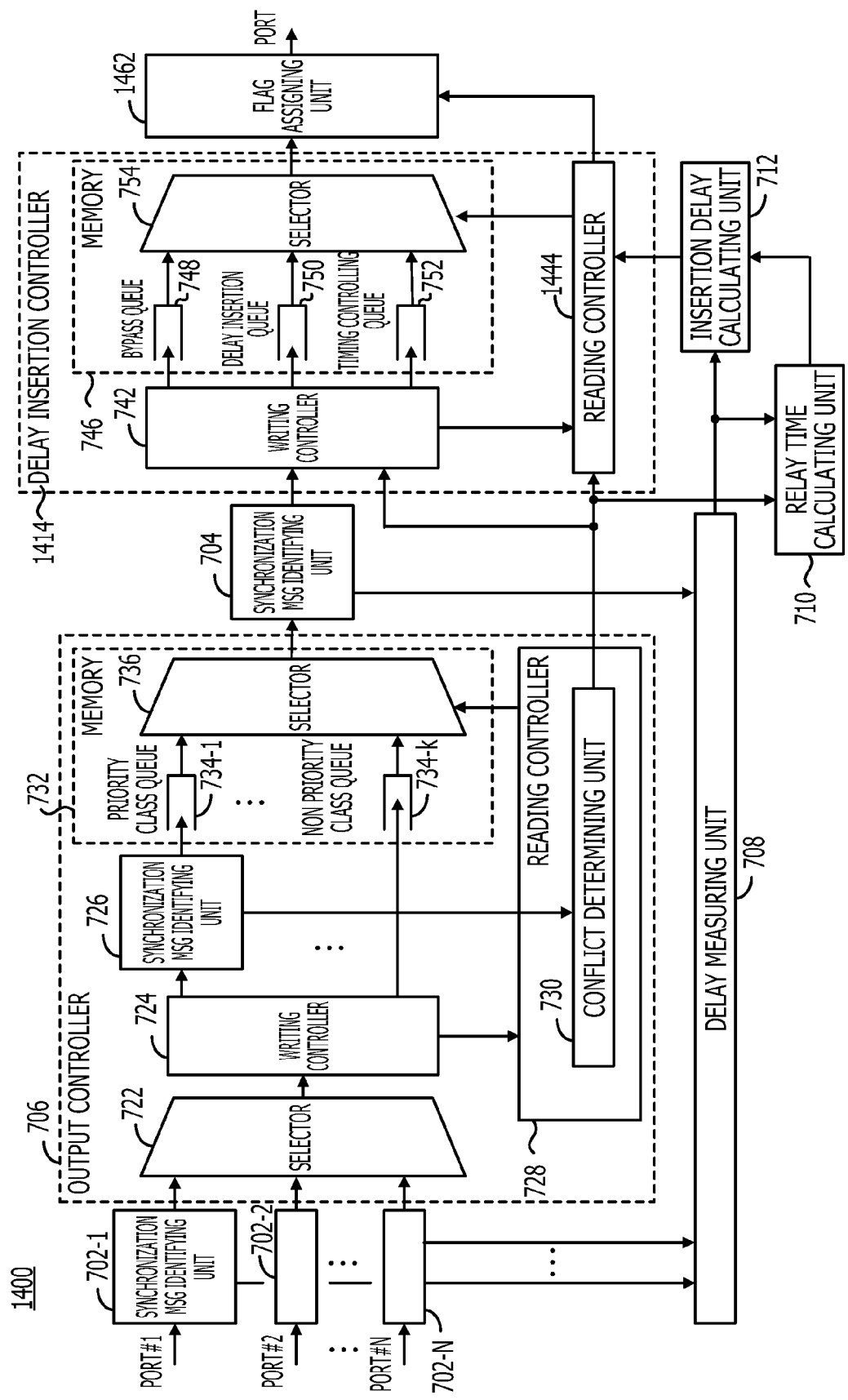
FIG. 14 is a diagram illustrating a configuration of a relaying apparatus 1400 according to a second embodiment.

FIG. 14 is a diagram illustrating a configuration of a relaying apparatus 1400 according to the second embodiment. The relaying apparatus 1400 illustrated in FIG. 14 is a transmission apparatus and is different from the relaying apparatus 700 illustrated in FIG. 7 in that a flag assigning unit 1462 is additionally provided and a delay insertion controller 1414 and a reading controller 1444 are provided instead of the delay insertion controller 714 and the reading controller 744. However, other portions of the relaying apparatus 1400 are the similar to those of the relaying apparatus 700. Components the similar to those of the relaying apparatus 700 illustrated in FIG. 7 are denoted by reference numerals the similar to those of FIG. 7. Operations and functions of the portions denoted by the reference numerals the similar to those of FIG. 7 are the similar to those described with reference to FIG. 7, and therefore, descriptions thereof are omitted.

In the relaying apparatus 1400, the reading controller 1444 of the delay insertion controller 1414 has the same function as the delay insertion controller 714 illustrated in FIG. 7 and outputs flag setting information representing whether a delay has been inserted to an a synchronization message output from a selector 754 to the flag assigning unit 1462 along with synchronization message identifying information of the corresponding synchronization message.

The flag assigning unit 1462 receives packet data stored in one of a bypass queue 748, a delay insertion queue 750, and a timing controlling queue 752 from the selector 754. The flag assigning unit 1462 receives the flag setting information and the corresponding synchronization message identifying information from the reading controller 1444.

The flag assigning unit 1462 assigns, when the received packet data is a synchronization message including the received synchronization message identifying information, a delay insertion flag to the received synchronization message. The flag assigning unit 1462 outputs the synchronization message to which the delay insertion flag has been assigned to an output port.

The delay insertion flag is stored, for example, a dedicated filed which is set in a reserved region of a PTP message (synchronization message) illustrated in FIG. 8 in advance. The flag assigning unit 1462 assigns, when the received flag setting information represents that a delay has been inserted, a delay insertion flag representing that a delay has been inserted to the received synchronization message.

As described above, the relaying apparatus 1400 transmits the synchronization message to a master apparatus or a slave apparatus in a state in which the flag assigning unit 1462 assigns the delay insertion flag representing whether a delay has been inserted into a synchronization message output by the delay insertion controller 1414.

Accordingly, since an insertion of a delay by the delay insertion controller 1414 represents presence of conflict of the synchronization message in an output controller 706, the slave apparatus receives the synchronization message through the relaying apparatus 1400 and monitors the delay insertion flag of the received synchronization message when calculating a time offset amount using Expression (1) in accordance with the time synchronization method of the IEEE1588 illustrated in FIG. 1 so as to more easily and more reliably determine whether a conflict state of the synchronization message transmitted from the master apparatus to the slave apparatus and a conflict state of the synchronization message transmitted from the slave apparatus to the master apparatus are the similar to each other.

The slave apparatus determines that the conflict states are the similar to each other when a delay insertion flag included in a Sync message of a PTP message (synchronization message) and a delay insertion flag included in a Delay-Resp message are the similar to each other. Note that, when receiving the Delay-Req message, the master apparatus directly assigns a delay insertion flag assigned to the Delay-Req message to the Delay-Resp message and transmits the Delay-Resp message including the same delay insertion flag as the Delay-Req message to the slave apparatus.

Accordingly, since the slave apparatus may reliably calculate a time offset value with ease when performing a time synchronization process, a processing load is reduced in the time synchronization process performed by the slave apparatus, and reliability of the time synchronization process performed by the slave apparatus is improved.

Hereinafter, a relaying apparatus and a relaying method according to a third embodiment will be described.

Figure 15:
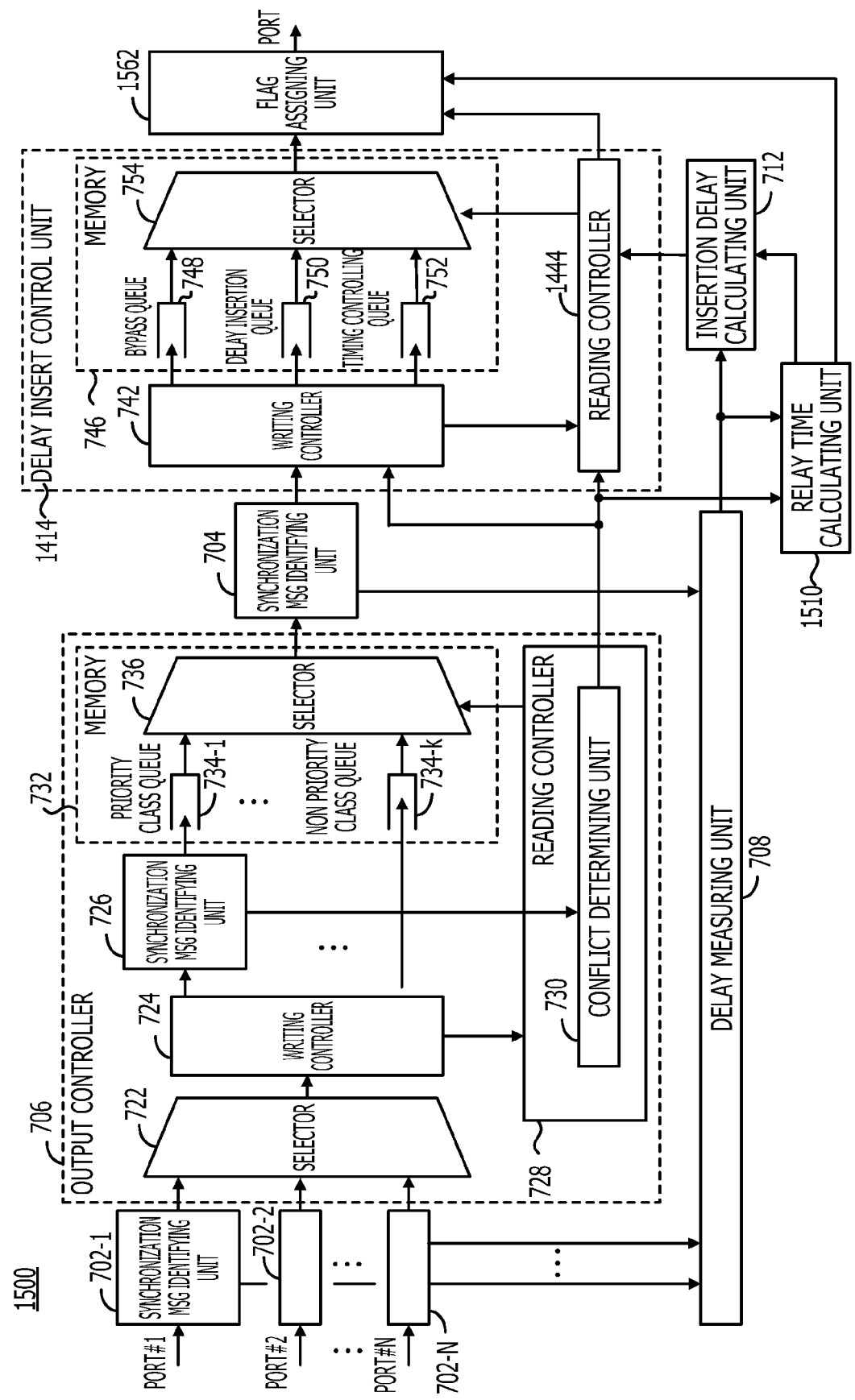
FIG. 15 is a diagram illustrating a configuration of a relaying apparatus 1500 according to a third embodiment.

FIG. 15 is a diagram illustrating a configuration of a relaying apparatus 1500 according to the third embodiment. The relaying apparatus 1500 illustrated in FIG. 15 is a transmission apparatus and is different from the relaying apparatus 1400 illustrated in FIG. 14 in that a flag assigning unit 1562 and a relay time calculating unit 1510 are additionally provided instead of the flag assigning unit 1462 and the relay time calculating unit 710. However, other portions of the relaying apparatus 1500 are the similar to those of the relaying apparatus 1400. Components the similar to those of the relaying apparatus 1400 illustrated in FIG. 14 are denoted by reference numerals the similar to those of FIG. 14. Operations and functions of the portions denoted by the reference numerals the similar to those of FIG. 14 are the similar to those described with reference to FIGS. 7 and 14, and therefore, descriptions thereof are omitted.

The relay time calculating unit 1510 has a function the similar to that of the relay time calculating unit 710 illustrated in FIG. 7 and outputs relay time change information representing that a relay time setting value to be supplied to an insertion delay calculating unit 712 is changed to the flag assigning unit 1562.

The flag assigning unit 1562 receives packet data stored in one of a bypass queue 748, a delay insertion queue 750, and a timing controlling queue 752 from a selector 754. The flag assigning unit 1562 receives flag setting information and corresponding synchronization message identifying information from the reading controller 1444 and receives the relay time change information from the relay time calculating unit 1510.

The flag assigning unit 1562 assigns, when received packet data is a synchronization message including the received synchronization message identifying information, a delay insertion flag and a relay time change flag to the received synchronization message. The flag assigning unit 1562 outputs the synchronization message to which the delay insertion flag and the relay time change flag have been assigned to an output port.

The delay insertion flag and the relay time change flag are individually stored in a dedicated fields set in advance in reserved regions of a PTP message (synchronization message) illustrated in FIG. 8, for example. The flag assigning unit 1562 assigns, when the received flag setting information represents that a delay has been inserted, a delay insertion flag representing that a delay has been inserted to the received synchronization message whereas assigns, when the received relay time change information represents that a relay time setting value has been changed, the relay time change flag representing that a relay time set in the relaying apparatus 1500 has been changed to the received synchronization message.

As described above, the relaying apparatus 1500 transmits the synchronization message to a master apparatus or a slave apparatus in a state in which the flag assigning unit 1562 assigns the relay time change flag representing whether a relay time set by the relaying apparatus 1500 has been changed in addition to the delay insertion flag representing whether a delay has been inserted into by synchronization message output by the delay insertion controller 1414.

Accordingly, the slave apparatus monitors the delay insertion flag of the received synchronization message when calculating a time offset amount using Expression (1) in accordance with the time synchronization method of the IEEE1588 illustrated in FIG. 1 so as to more easily and more reliably determine whether a conflict state of a synchronization message transmitted from the master apparatus to the slave apparatus and a conflict state of a synchronization message transmitted from the slave apparatus to the master apparatus are the similar to each other.

Furthermore, the slave apparatus performs calculation control in accordance with a determination as to whether the relay time set by the relaying apparatus 1500 has been changed by monitoring the relay time change flag of the received synchronization message when a time offset amount is calculated in accordance with Expression (1) in a case where the synchronization message is involved in conflict.

The slave apparatus monitors whether the relay time change flag assigned to the received synchronization message represents that the relay time has been changed, for example, and when the relay time change flag represents that the relay time has been changed, the slave apparatus does not perform a calculation of a time offset amount using the received synchronization message.

Alternatively, the slave apparatus calculates a difference value between a transmission time t-ms of a synchronization message transmitted from the master apparatus to the slave apparatus and a transmission time t-sm of a synchronization message transmitted from the slave apparatus to the master apparatus when the relay time change flag represents that the relay time has been changed. When the difference value is larger than a given threshold value, the slave apparatus may determine that a measurement error between the transmission time t-ms and the transmission time t-sm exceeds an allowable range and may not calculate a time offset amount.

Accordingly, since the slave apparatus may reliably calculate a time offset value with ease when performing a time synchronization process, a processing load is reduced in the time synchronization process performed by the slave apparatus and reliability of the time synchronization process performed by the slave apparatus is improved.

Hereinafter, a relaying apparatus and a relaying method according to a fourth embodiment will be described.

Figure 16:
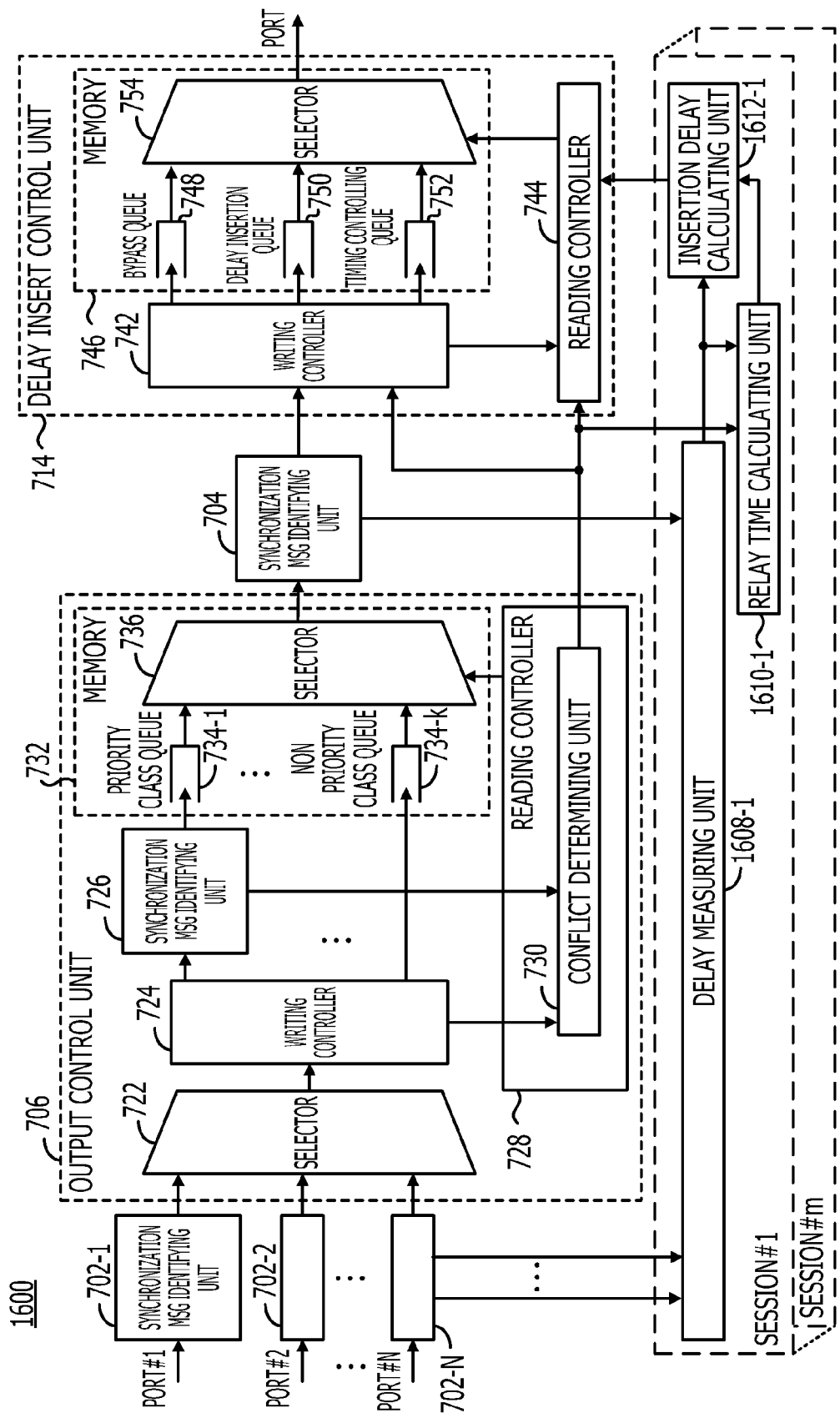
FIG. 16 is a diagram illustrating a configuration of a relaying apparatus 1600 according to a fourth embodiment.

FIG. 16 is a diagram illustrating a configuration of a relaying apparatus 1600 according to the fourth embodiment. The relaying apparatus 1600 illustrated in FIG. 16 is a transmission apparatus and is different from the relaying apparatus 700 illustrated in FIG. 7 in that a group of a delay measuring unit 1608, a relay time calculating unit 1610, and an insertion delay calculating unit 1612 is disposed in each of sessions between the master apparatus and the slave apparatus. Other portions of the relaying apparatus 1600 are the similar to those of the relaying apparatus 700. Components the similar to those of the relaying apparatus 700 illustrated in FIG. 7 are denoted by reference numerals the similar to those of FIG. 7. Operations and functions of the portions denoted by the reference numerals the similar to those of FIG. 7 are the similar to those described with reference to FIG. 7, and therefore, descriptions thereof are omitted.

In the relaying apparatus 1600, taking a case where a plurality of sessions in which packet data is transmitted through the relaying apparatus 1600 are established into consideration, the plurality of delay measuring units 1608 (1608-1 to 1608-*m*), the plurality of relay time calculating units 1610 (1610-1 to 1610-*m*), and the plurality of insertion delay calculating units 1612 (1612-1 to 1612-*m*) are installed in the plurality of corresponding sessions.

The delay measuring unit 1608-1, the relay time calculating unit 1610-1, and the insertion delay calculating unit 1612-1 which are installed in a first session (session No. 1) measure a delay time generated by output timing control performed by the output controller 706 on a synchronization message corresponding to the first session, set a relay time setting value in accordance with the measured delay time, and calculate an insertion delay time.

Similarly, the delay measuring unit 1608-*m*, the relay time calculating unit 1610-*m*, and the insertion delay calculating unit 1612-*m* which are installed in an m-th session (session No. m) measure a delay time generated by the output timing control performed by the output controller 706 on a synchronization message corresponding to the m-th session, set a relay time setting value in accordance with the measured delay time, and calculate an insertion delay time.

Figure 2:
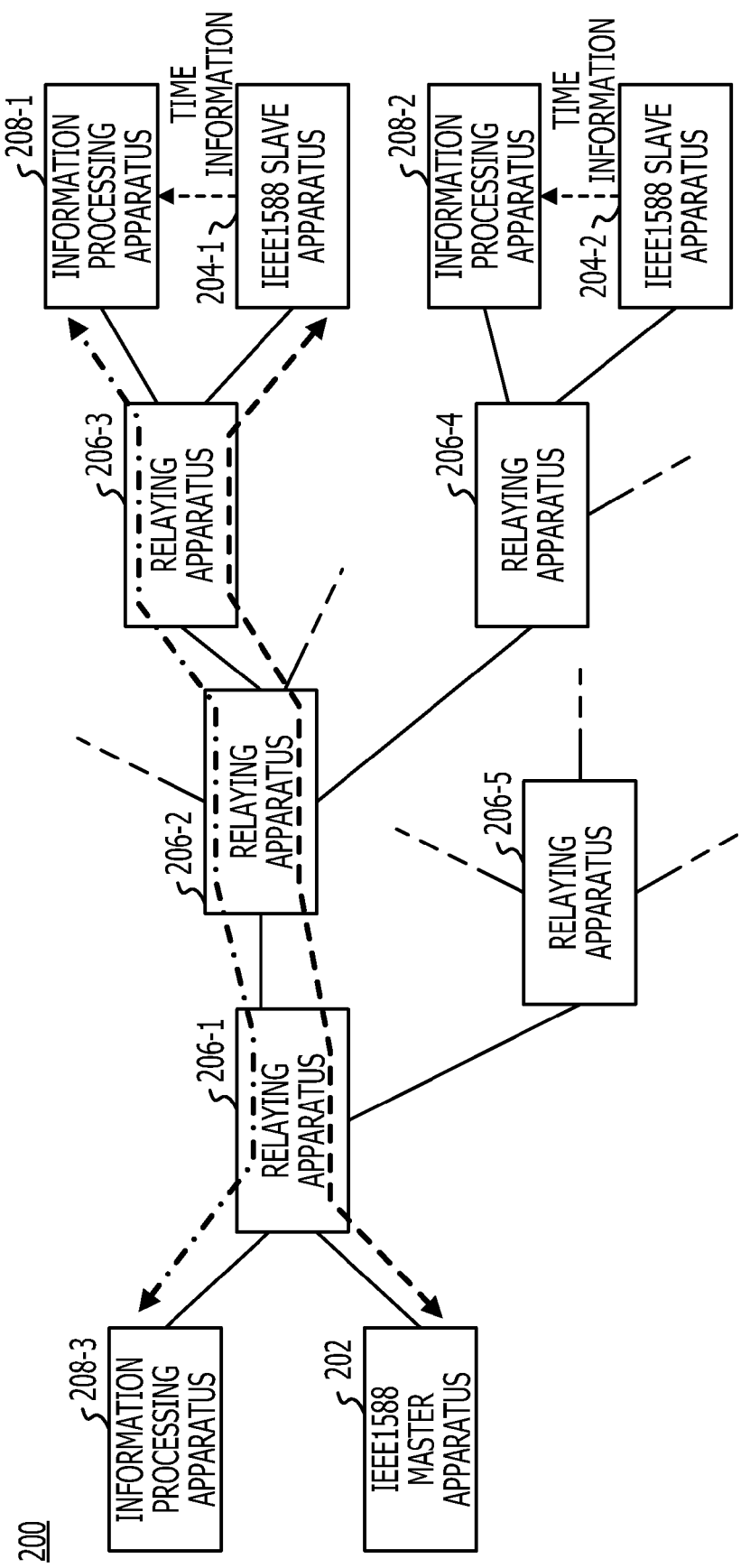
FIG. 2 is a diagram illustrating a packet transmission network 200 including a master apparatus and a slave apparatus which conform to the IEEE 1588.
Figure 3:
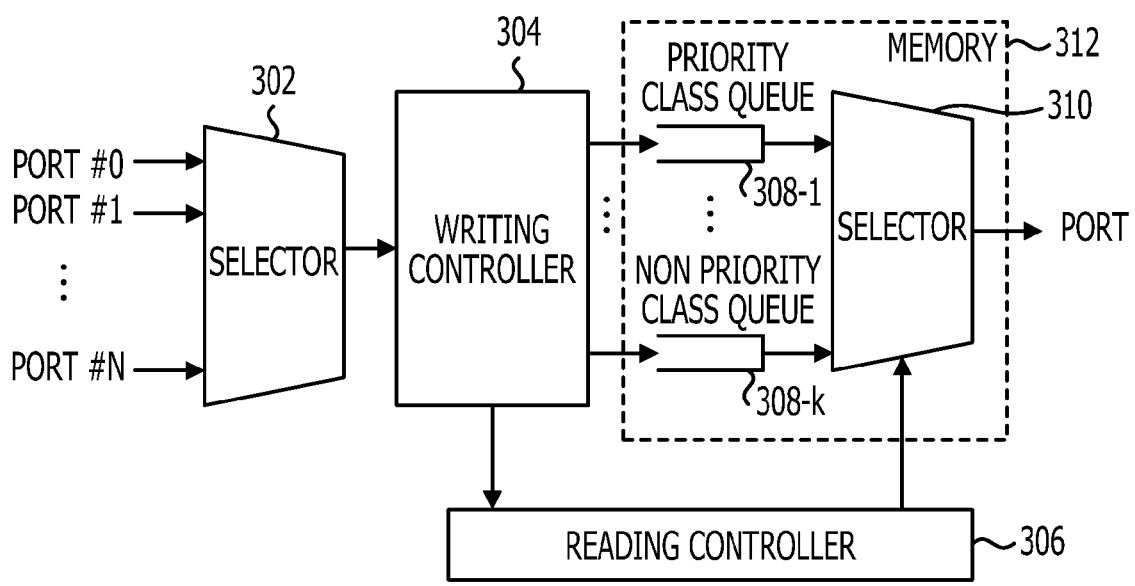
FIG. 3 is an internal configuration of a relaying apparatus 206.
Figure 4:
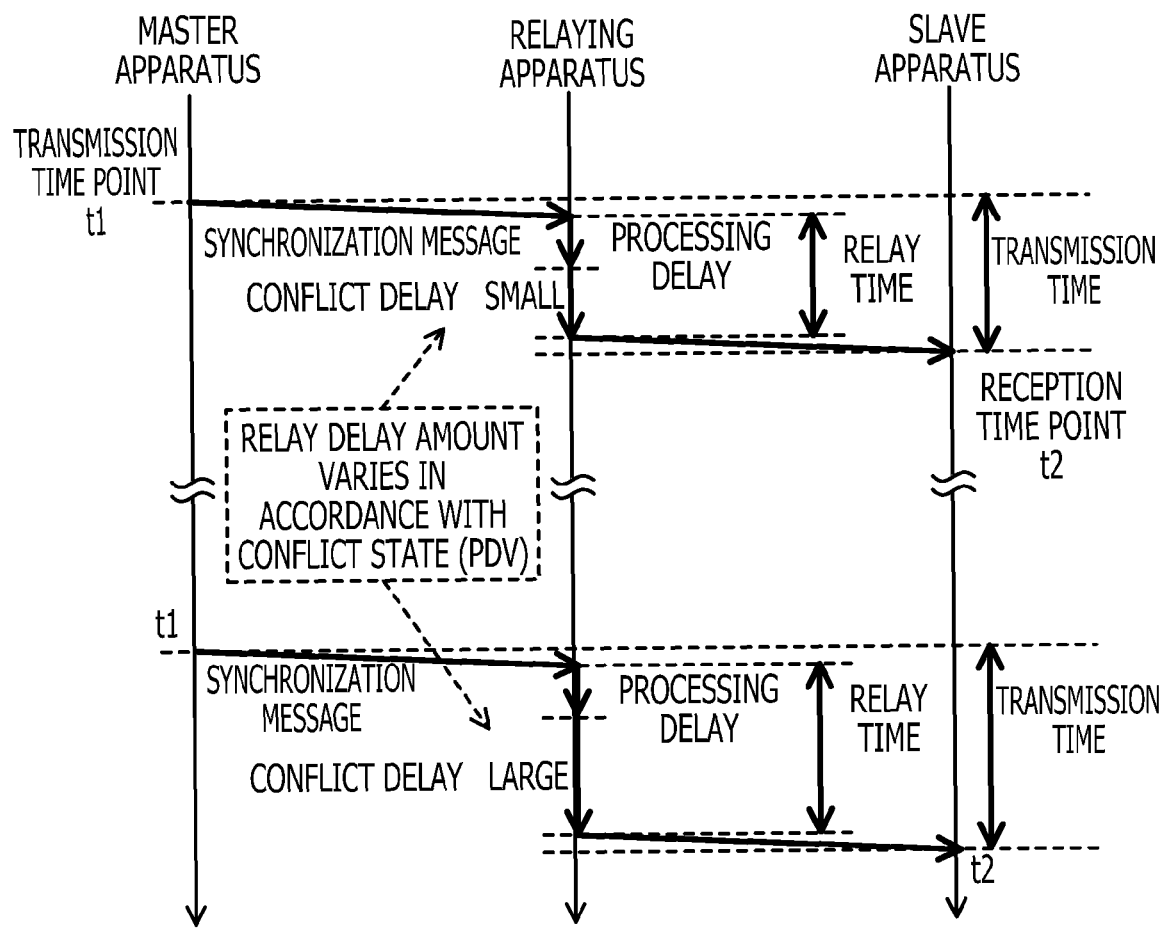
FIG. 4 is a diagram illustrating PDV of a synchronization message.

For example, in the packet transmission network 200 illustrated in FIG. 2, when a session between the master apparatus 202 and the slave apparatus 204-1 and a session between the master apparatus 202 and the slave apparatus 204-2 are established, different groups of the delay measuring unit 1608, the relay time calculating unit 1610, and the insertion delay calculating unit 1612 are assigned to the two sessions in the relaying apparatus 206-1.

Identification of the sessions is performed by the delay measuring units 1608-1 to 1608-*m* in accordance with MAC address information MAC DA and MAC address information MAC SA which are included in synchronization message identifying information output from synchronization message identifying units 702 and 704. The delay measuring units 1608-1 to 1608-*m* individually identify the sessions in accordance with transmission source MAC addresses and destination MAC addresses represented by the MAC address information MAC DA and the MAC address information MAC SA. When a transmission source MAC address and a destination MAC address are the similar to each other, corresponding synchronization messages are determined to belong to the same session.

Note that operations of the delay measuring units 1608-1 to 1608-*m*, the relay time calculating units 1610-1 to 1610-*m*, and the insertion delay calculating units 1612-1 to 1612-*m* are the similar to those of the delay measuring unit 708, the relay time calculating unit 710, and the insertion delay calculating unit 712 illustrated in FIG. 7, and therefore, detailed descriptions thereof are omitted.

As described above, in the relay apparatus 1600, when a plurality of sessions are established in different pairs of master apparatuses and slave apparatuses and synchronization messages corresponding to a number of sessions is transmitted through the single relaying apparatus 1600, a delay time generated by output timing control performed by an output controller 706 is measured and a relay time setting value is set for each session. Accordingly, since relay time setting values which are optimized for individual sessions are set in the relaying apparatus 1600, relay times of the relaying apparatus 1600 are fixed to short periods of time in accordance with traffic states of the sessions while variation of the relay times are absorbed.

In this way, since a message transmission time between the master apparatus and the slave apparatus may be made small, when the time synchronization processing is performed by the slave apparatus in accordance with the IEEE1588 time synchronization method illustrated in FIG. 1, influence of frequency deviation of an oscillator included in the slave apparatus may be reduced without using an expensive oscillator and reliability of the time synchronization processing performed by the slave apparatus is improved.

Hereinafter, a relaying apparatus and a relaying method according to a fifth embodiment will be described.

Figure 17:
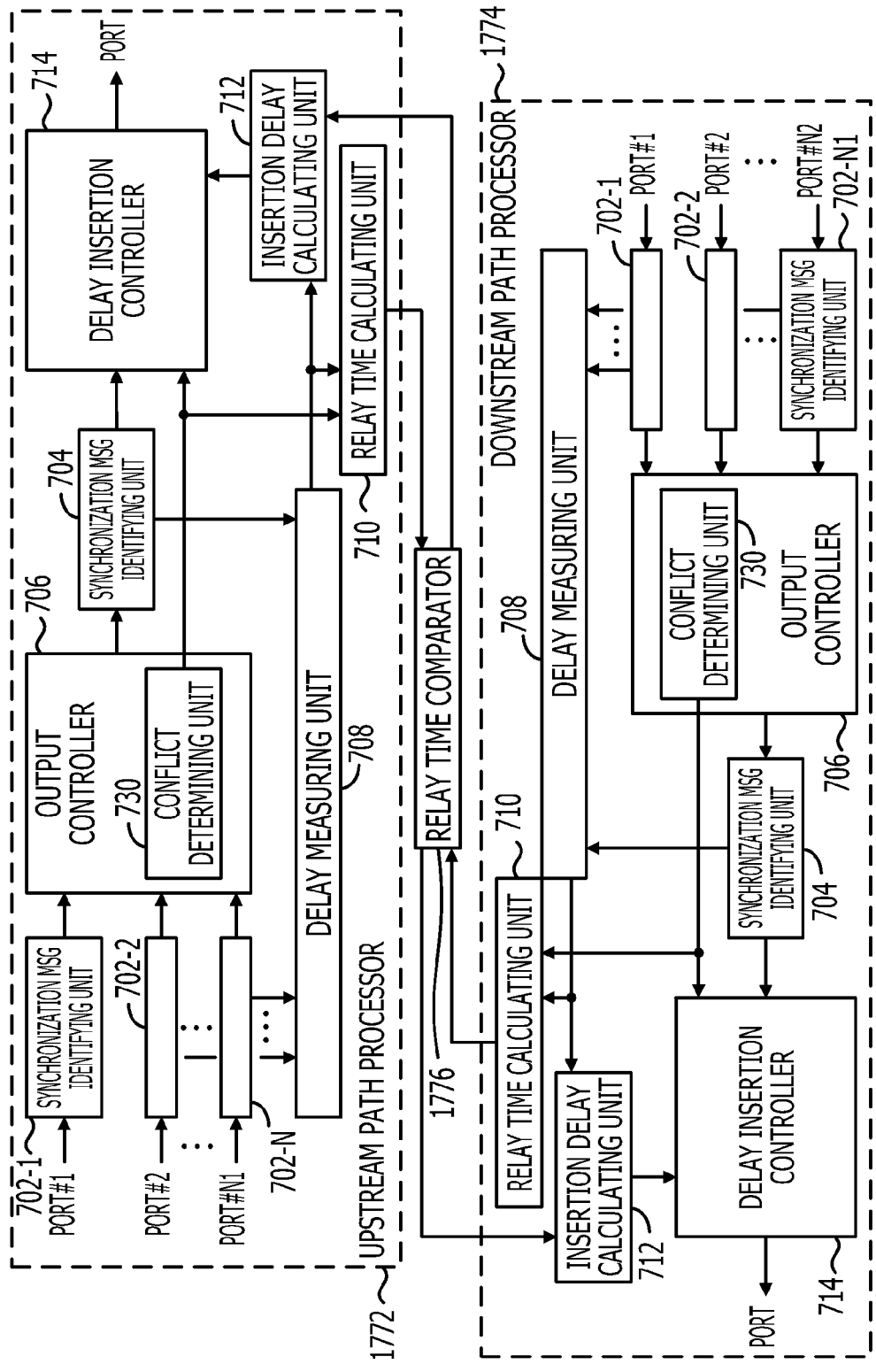
FIG. 17 is a diagram illustrating a configuration of a relaying apparatus 1700 according to a fifth embodiment.

FIG. 17 is a diagram illustrating a configuration of a relaying apparatus 1700 according to the fifth embodiment. The relaying apparatus 1700 illustrated in FIG. 17 is a transmission apparatus which includes an upstream path processor 1772, a downstream path processor 1774, and a relay time comparator 1776.

The upstream path processor 1772 is a section which processes packet data transmitted through a first direction of a bidirectional transmission path (upstream path) which extends through the relaying apparatus 1700 and processes packet data transmitted through a path from a slave apparatus to a master apparatus, for example. The downstream path processor 1774 is a section which processes packet data transmitted through a second direction of the bidirectional transmission path (downstream path) and processes packet data transmitted through a path from the master apparatus to the slave apparatus, for example.

Note that, in many cases, a plurality of output ports are provided on an upstream side and a downstream side in the relaying apparatus 1700, a number of upstream path processors 1772 corresponding to the number of output ports on the upstream side are provided, and a number of downstream path processors 1774 corresponding to the number of output ports on the downstream side are provided. However, the upstream path processor 1772 and the downstream path processor 1774 which are coupled to the relay time comparator 1776 disposed therebetween preferably relay synchronization messages which belong to the same session and preferably relay synchronization messages to be exchanged between the same master apparatus and the same slave apparatus.

Each of the upstream path processor 1772 and the downstream path processor 1774 has the same configuration as the relaying apparatus 700 illustrated in FIG. 7, and components the similar to or corresponding to those of the relaying apparatus 700 illustrated in FIG. 7 are denoted by the same reference numerals. Operations and functions of the portions denoted by the reference numerals the similar to those of FIG. 7 are the similar to those described with reference to FIG. 7, and therefore, descriptions thereof are omitted.

The relay time comparator 1776 disposed between the upstream path processor 1772 and the downstream path processor 1774 receives relay time information from a relay time calculating unit 710 of the upstream path processor 1772 and a relay time calculating unit 710 of the downstream path processor 1774. The relay time comparator 1776 compares a relay time setting value set in the upstream path processor 1772 with a relay time setting value set in the downstream path processor 1774 in accordance with the received two relay time information. The relay time comparator 1776 selects a larger one of the relay time setting values through the comparison and outputs the selected larger relay time setting value to an insertion delay calculating unit 712 of the upstream path processor 1772 and an insertion delay calculating unit 712 of the downstream path processor 1774 as an updated value of the relay time setting value.

The insertion delay calculating unit 712 of the upstream path processor 1772 and the insertion delay calculating unit 712 of the downstream path processor 1774 individually receive the updated value of the relay time setting value and perform a process of calculating an insertion delay time in accordance with the received undated value of the relay time setting value.

As described above, in the relaying apparatus 1700, since the relay time setting values set in the upstream path processor 1772 and the downstream path processor 1774 are the similar to each other, a relay time of the upstream path and a relay time of the downstream path in the relaying apparatus 1700 are the similar to each other.

By this, when the slave apparatus calculates a time offset amount using Expression (1) in accordance with the time synchronization method conforming to the IEEE1588 illustrated in FIG. 1, a transmission time t-ms of a synchronization message from the master apparatus to the slave apparatus and a transmission time t-sm of a synchronization message from the slave apparatus to the master apparatus may be the similar to each other, and a measurement difference between the transmission time t-ms and the transmission time t-sm may be made close to zero.

Accordingly, when performing the time synchronization process, the slave apparatus may more easily and more reliably calculates the time offset value and reliability of the time synchronization process performed by the slave apparatus is further improved.

Note that, although the relay time comparator 1776 is provided between the single upstream path processor 1772 and the single downstream path processor 1774 in the example illustrated in FIG. 17, the present disclosure is not limited to this.

In many cases, in the relaying apparatus 1700, a plurality of output ports are provided, a number of upstream path processors 1772 corresponding to the number of output ports on the upstream side are provided, and a number of downstream path processors 1774 corresponding to the number of output ports on the downstream side are provided.

Therefore, the relay time comparator 1776 disposed between the plurality of upstream path processors 1772 and the downstream path processors 1774 and the relay time comparator 1776 may receive relay time information from the plurality of upstream path processors 1772 and the plurality of downstream path processors 1774. In this case, the relay time comparator 1776 obtains the maximum value in all relay time setting values represented by the received relay time information. The relay time comparator 1776 outputs the obtained maximum value of the relay time setting values to the upstream path processor 1772 and the downstream path processor 1774.

According to the embodiments, influence of frequency deviation of an oscillator is reduced in a time synchronization process executed by a slave apparatus, and accordingly, reliability of processing of a relaying apparatus is improved.

Although the relaying apparatuses and the relaying methods of the embodiments have been described hereinabove, the present disclosure is not limited to the embodiments disclosed in detail and various modifications and alterations may be made without departing from the scope of claims. The techniques disclosed in the embodiments may be combined with one another as long as the techniques conflict with one another.

All examples and conditional language recited herein are intended for pedagogical purposes to aid the reader in understanding the invention and the concepts contributed by the inventor to furthering the art, and are to be construed as being without limitation to such for example recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relaying apparatus that receives packet data, the relaying apparatus comprising:
    a memory that stores a program including a procedure; and
    a processor that executes the program including the procedure, wherein the procedure includes:
        checking whether another packet data is outputting from a memory that stores packet data;
        delaying, when the received packet data includes a synchronization message for any one of a frequency synchronization and a time synchronization and the checking indicates that the another packet data is outputting from the memory that stores packet data, a transmission of the received packet data so that a period of time for a relaying process attains a given value.

2. The relaying apparatus according to claim 1, wherein the procedure includes:
    obtaining a delay time of the synchronization message and delay times of synchronization messages included in other received packet data,
    calculating a relay time setting value corresponding to the given value of the period of time for the relaying process in accordance with the obtained delay times, and
    calculating an insertion delay time in accordance with the obtained delay time and the relay time setting value of the synchronization message, and
    wherein the transmission of the received packet data is delayed in accordance with the obtained insertion delay time.

3. The relaying apparatus according to claim 2, wherein the maximum value in the obtained delay times is calculated as the relay time setting value.

4. The relaying apparatus according to claim 1, wherein the synchronization message includes time information representing a time point when the synchronization message is transmitted from a transmission source to a destination of the synchronization message.

5. The relaying apparatus according to claim 1, wherein the synchronization message is a PTP message conforming to the IEEE1588.

6. The relaying apparatus according to claim 2, wherein an average value among the obtained delay times is calculated as the relay time setting value.

7. The relaying apparatus according to claim 2, wherein a period of time corresponding to a difference between the relay time setting value and the obtained delay time is calculated as the insertion delay time.

8. The relaying apparatus according to claim 2, wherein the procedure includes discarding the synchronization message when the received packet data includes the synchronization message which waits to be transmitted and the delay time of the synchronization message is larger than the relay time setting value.

9. The relaying apparatus according to claim 2, wherein the procedure includes:
  periodically setting a measurement period in which the delay time of the synchronization message is measured, and
  periodically updating the relay time setting value in accordance with the obtained delay times.

10. The relaying apparatus according to claim 9, wherein the relay time setting value is periodically updated by setting one of discrete setting values as the relay time setting value.

11. The relaying apparatus according to claim 2, wherein the procedure includes assigning first flag information representing that a delay has been inserted to the synchronization message which waits to be transmitted when a transmission of the received packet data is delayed in accordance with the calculated insertion delay time.

12. The relaying apparatus according to claim 11, wherein the procedure includes assigning second flag information representing updating of the relay time setting value to the synchronization message which waits to be transmitted when the obtained relay time is updated.

13. The relaying apparatus according to claim 2, wherein the procedure includes:
  calculating the relay time setting value for each session in which the synchronization message is transmitted, and
  calculating the insertion delay time for each session in accordance with the relay time setting value calculated for each session and the delay time of the synchronization message.

14. The relaying apparatus according to claim 2, wherein the procedure includes:
  individually calculating the relay time setting value of an upstream transmission path which transmits the synchronization message and the relay time setting value of a downstream transmission path which transmits the synchronization message,
  comparing the relay time setting value corresponding to the upstream transmission path with the relay time setting value corresponding to the downstream transmission path,
  selecting a larger one of the two compared relay time setting values, and
  individually calculating the insertion delay time of the upstream transmission path and the insertion delay time of the downstream transmission path in accordance with the selected relay time setting value.

15. The relaying apparatus according to claim 2, wherein the procedure includes:
  controlling an output timing when the received packet data is output to a delay insertion controller,
  determining, when the received packet data includes the synchronization message, whether the synchronization message conflicts with other received packet data and determining, when the conflict occurs, that the waiting of a transmission occurs, and
  determining, when the synchronization message is received at a timing when other packet data received before the synchronization message is output, that conflict occurs.

16. The relaying apparatus according to claim 15, wherein the procedure includes determining, when a period of time in which a transmission is waited since the other packet data received before the synchronization message exists is shorter than a given threshold value, that the conflict does not occur.

17. The relaying apparatus according to claim 15, wherein the procedure includes:
  determining, when the received packet data includes the synchronization message, whether the synchronization message conflicts with other received packet data, and
  determining, when the received packet data is identified as the synchronization message at a timing when reading packet data stored in the memory that stores packet data is instructed, that conflict occurs.

18. The relaying apparatus according to claim 17, wherein the procedure includes:
  determining, when a difference between a timing when reading packet data stored in the memory that stores packet data is instructed and a timing when the received packet data is identified as the synchronization message is larger than a given threshold value, that the conflict does not occur.

19. The relaying apparatus according to claim 2, wherein the procedure includes:
  delaying, when the synchronization message stored in the memory that stores packet data is involved in the conflict, a timing when the synchronization message is read from the memory that stores packet data in accordance with the insertion delay time, and
  reading, when the synchronization message stored in the memory that stores packet data is not involved in the conflict, the synchronization message from the memory that stores packet data in the minimum delay time.

20. A relaying method for received packet data, the method comprising:
  checking whether another packet data is outputting from a memory;
  delaying, when the received packet data includes a synchronization message for any one of a frequency synchronization and a time synchronization and the checking indicates that the another packet data is outputting from the memory, a transmission of the received packet data so that a period of time for a relaying process attains a given value using a processor.

* * * * *